United States Patent [19]
Jamison

[11] Patent Number: 5,093,666
[45] Date of Patent: Mar. 3, 1992

[54] LOBING SYSTEM

[75] Inventor: Richard S. Jamison, Los Angeles, Calif.

[73] Assignee: Hughes Aircraft Company, Los Angeles, Calif.

[21] Appl. No.: 249,557

[22] Filed: Jan. 2, 1963

[51] Int. Cl.$^5$ .................... G01S 13/44; G01S 13/94
[52] U.S. Cl. .................................... 342/150; 342/65
[58] Field of Search .................. 343/16.1, 16.2, 16, 343/116, 100.3, 113.1, 7 TA; 333/1.1, 24.1, 24 G, 24.3; 342/149, 155, 65, 150, 149, 155

[56] References Cited

U.S. PATENT DOCUMENTS 3,893,116  7/1975  Hudspeth et al. .................. 342/155

Primary Examiner—Gilberto Barron, Jr.
Attorney, Agent, or Firm—Leonard A. Alkov; Wanda K. Denson-Low

[57] ABSTRACT

The radar system includes a sum and difference network coupled to a conventional monopulse type antenna. The difference signals or error signals are applied into a modulator in space quadrature with electrical vectors in a direction transverse to the direction of propagation polarized at right angles to each other. A rotating magnetic field in the modulator causes any energy that is in line with this field to be continually rotated and applied to a coupler that is sensitive. During search the shutter is closed so that only unmodulated sum energy is passed through the circulator to the receiving unit. For tracking the shutter is opened and the reflecting post is positioned to reflect a selected portion of the error signal energy and pass a selected portion of the sum signal energy, both of which are absorbed in the isolator. The system provides a simplified selection of the lobing frequency by controlling the velocity of the rotating magnetic field at the modulator. The system also operates in a terrain avoidance mode by properly controlling the modulator.

15 Claims, 12 Drawing Sheets

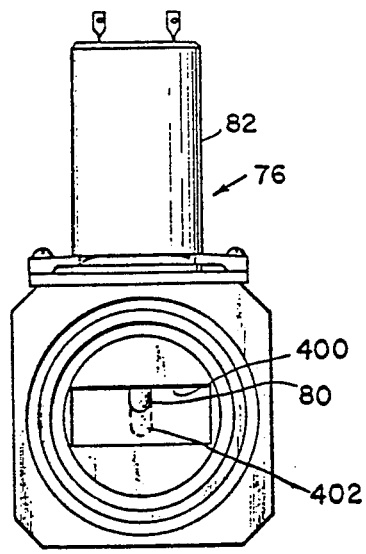
Fig. 5
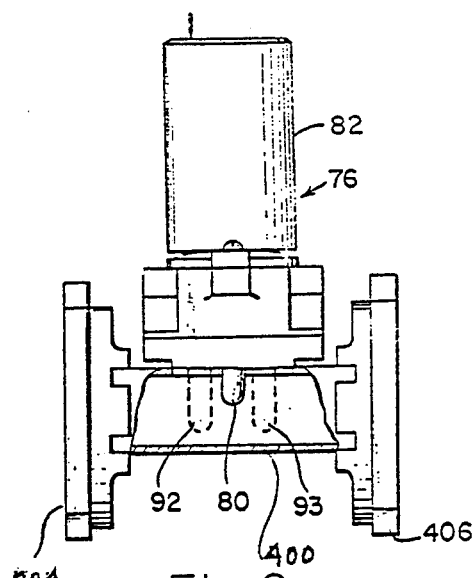
Fig. 6
Fig. 12.
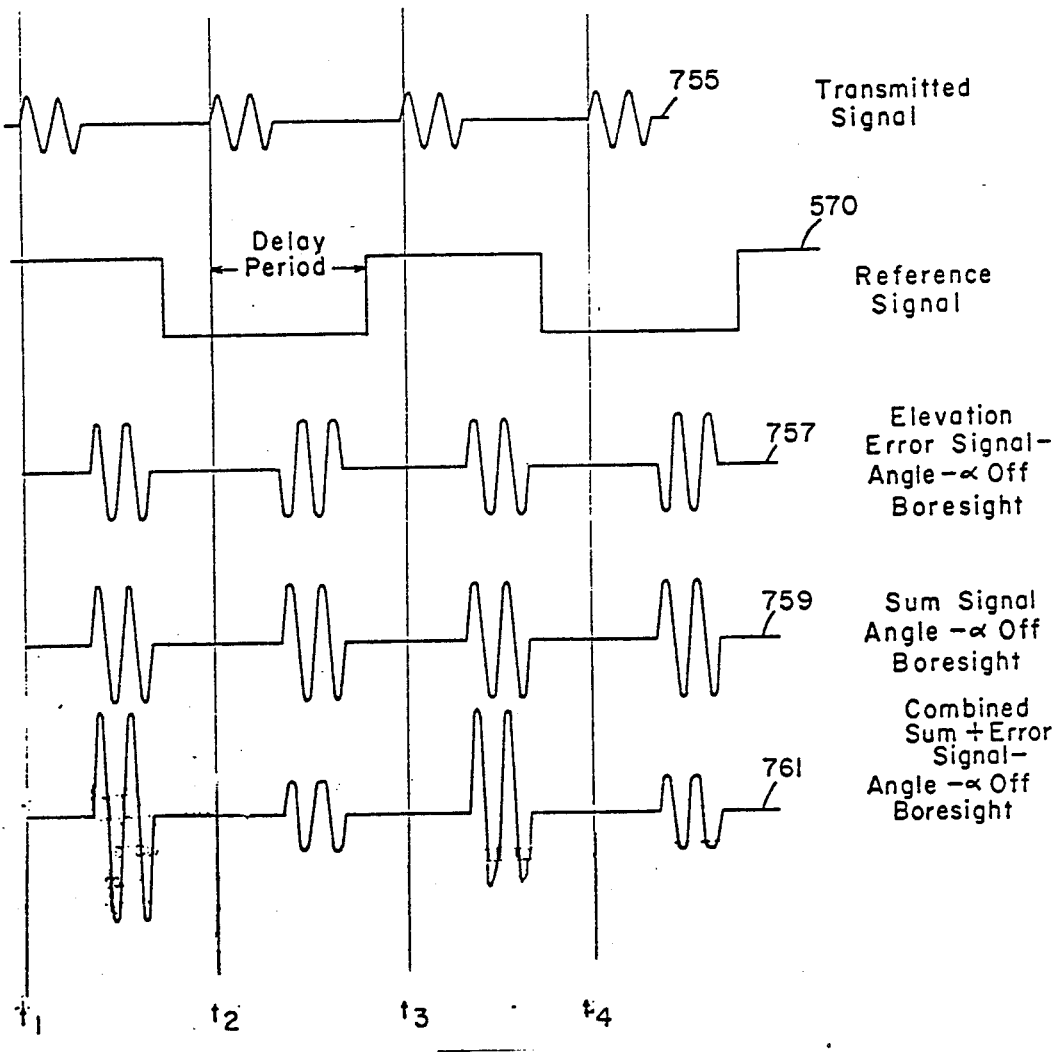

Fig. 7
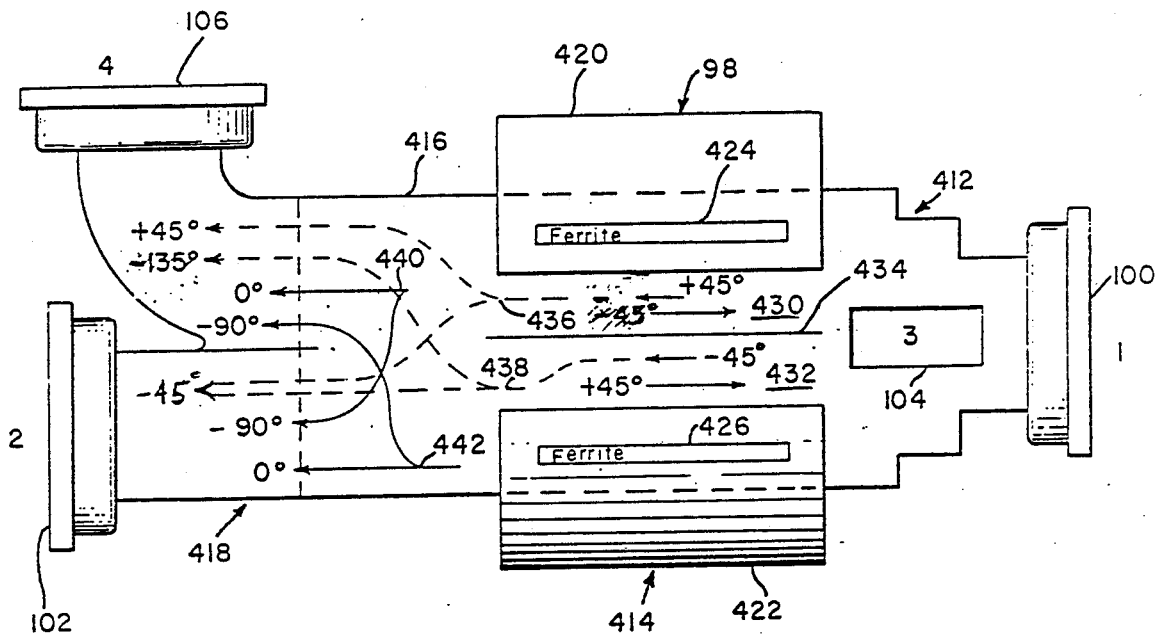
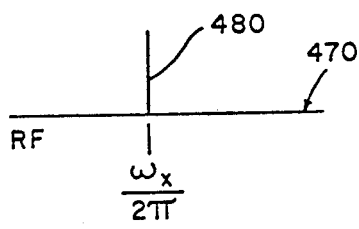
Azimuth And Elevation Error Signal
Fig. 10
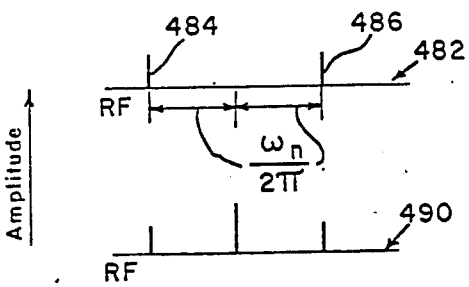
Combined Error Signal At Modulator Output
Common Signal At Output Of Capacitive Post
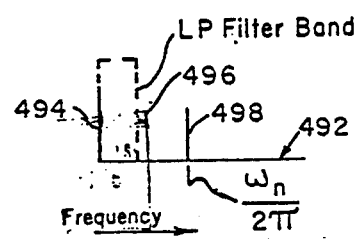
Detected Error Signal At At Output Of Envelope Detector

LOBING SYSTEM

This invention relates to radar systems and particularly to an improved radar system utilizing a monopulse antenna and developing modulation at microwave frequency of the echo signals to provide lobing in a simplified manner.

In prior art monopulse radar systems, target angular coordinates have been obtained by combining the radio frequency echo signals received in four apertures of a non-rotating monopulse antenna into sum and difference signals which are then heterodyned to intermediate frequency signals. Separate IF (intermediate frequency) amplifier channels are then utilized and the signals are detected to obtain a measure of the relative amplitudes and the angular displacement of the antenna axis from the source of signals. This type of arrangement provides problems in matching the IF amplifier channels in both phase and gain as well as resulting in a relatively complex system. Also this type of arrangement is highly sensitive to noise and interference such as jamming signals. Some systems provide multiplexing schemes at the intermediate frequency portion so as to utilize a common amplifier, but these arrangements have the disadvantages of complexity and a high degree of susceptibility to jamming.

Conventional conical scan antenna systems have the disadvantage of being highly susceptible to enemy jamming as lobing of the energy is performed during both transmitting and receiving. Another disadvantage of conventional conical scan systems is that tracking is performed at the crossover of the lobing beams, resulting in considerable loss in range.

Radar systems that provide lobing of the received echo signal to prevent external detection of the lobing frequency and that modulate and combine the input signals into a common signal at radio or microwave frequency have the advantage of being relatively unsusceptible to angle deception jamming and of utilizing a single IF amplifier strip. Also this type of system provides simplified selection of search and track operation and variation of the lobing frequency. Relatively complicated systems have been developed utilizing this lobing on reception principle and have been found to be highly reliable.

It is therefore an object of this invention to provide a simplified and highly reliable radar system that performs lobing of the received echo signal at radio frequency.

It is a further object of this invention to provide a simplified radar modulating system for combining the informational signals into a common signal for amplification.

It is still a further object of this invention to provide a radar lobing system utilizing a monopulse type antenna that provides signals similar to those of a conical scan system for converting conical scan systems with a minimum of modifications.

It is another object of this invention to provide a system for modulating and combining received echo signals at radio frequency with a minimum of electrically energized processing elements.

It is still another object of this invention to provide a radar system that provides a plurality of variable features for overcoming undesired interfering signals and for selecting operations such as searching and tracking.

It is a further object of this invention to provide a simplified radar system for controlling transmission and reception with a minimum of equipment.

It is a still further object of this invention to provide an improved terrain avoidance system.

According to one feature of this invention, the radar system includes a sum and difference network coupled to a conventional monopulse type antenna. The difference signals or error signals are applied into a modulator in space quadrature with electrical vectors in a direction transverse to the direction of propagation polarized at right angles to each other. A rotating magnetic field in the modulator causes any energy that is in line with this field to be continually rotated and applied to a coupler that is sensitive to only waves of a fixed polarization. The polarized and modulated azimuth and elevation error signals in phase quadrature are then applied from the modulator through an isolator to a reflection post to provide a summing point. The sum signal is applied from the sum and difference network through a circulator and in turn through a waveguide shutter to the reflection post. A transmitting and receiving unit is also coupled to the circulator for transmitting energy through the sum and difference network and for receiving energy from the path including the reflecting post and shutter. During search the shutter is closed so that only unmodulated sum energy is passed through the circulator to the receiving unit. For tracking the shutter is opened and the reflecting post is positioned to reflect a selected portion of the error signal energy and pass a selected portion of the sum signal energy, both of which are absorbed in the isolator. During normal tracking the error signal energy passed through the post which may be half of the input error energy for example, and the reflected sum energy which may be half of the input energy for example, are added at the post and applied through the circulator to the receiving unit. For a jam angle tracking operation when it is desired to increase the error signal and decrease the sum signal, the post is positioned to pass the majority of the impinged energy. The system provides a simplified selection of the lobing frequency by controlling the velocity of the rotating magnetic field at the modulator. The system also operates in a terrain avoidance mode by properly controlling the modulator.

The novel features of this invention, as well as the invention itself, both as to its organization and method of operation, will best be understood from the accompanying description, taken in connection with the accompanying drawings, in which like reference characters refer to like parts, and in which:

FIG. 5 is an end view of the capacitive post summer utilized in the system of FIG. 1;

FIG. 6 is a side view partially broken away of the capacitive post summer of FIG. 5;

FIG. 7 is a plan view of the ferrite circulators of FIG. 1 for explaining the operation thereof;

FIG. 10 is a spectral diagram of amplitude versus frequency for further explaining the operation of the modulator and the signal processing system of FIG. 1;

FIG. 12 is a schematic diagram of waveforms for explaining the operation of the system of FIG. 1 in the terrain avoidance mode;

Figure 1:
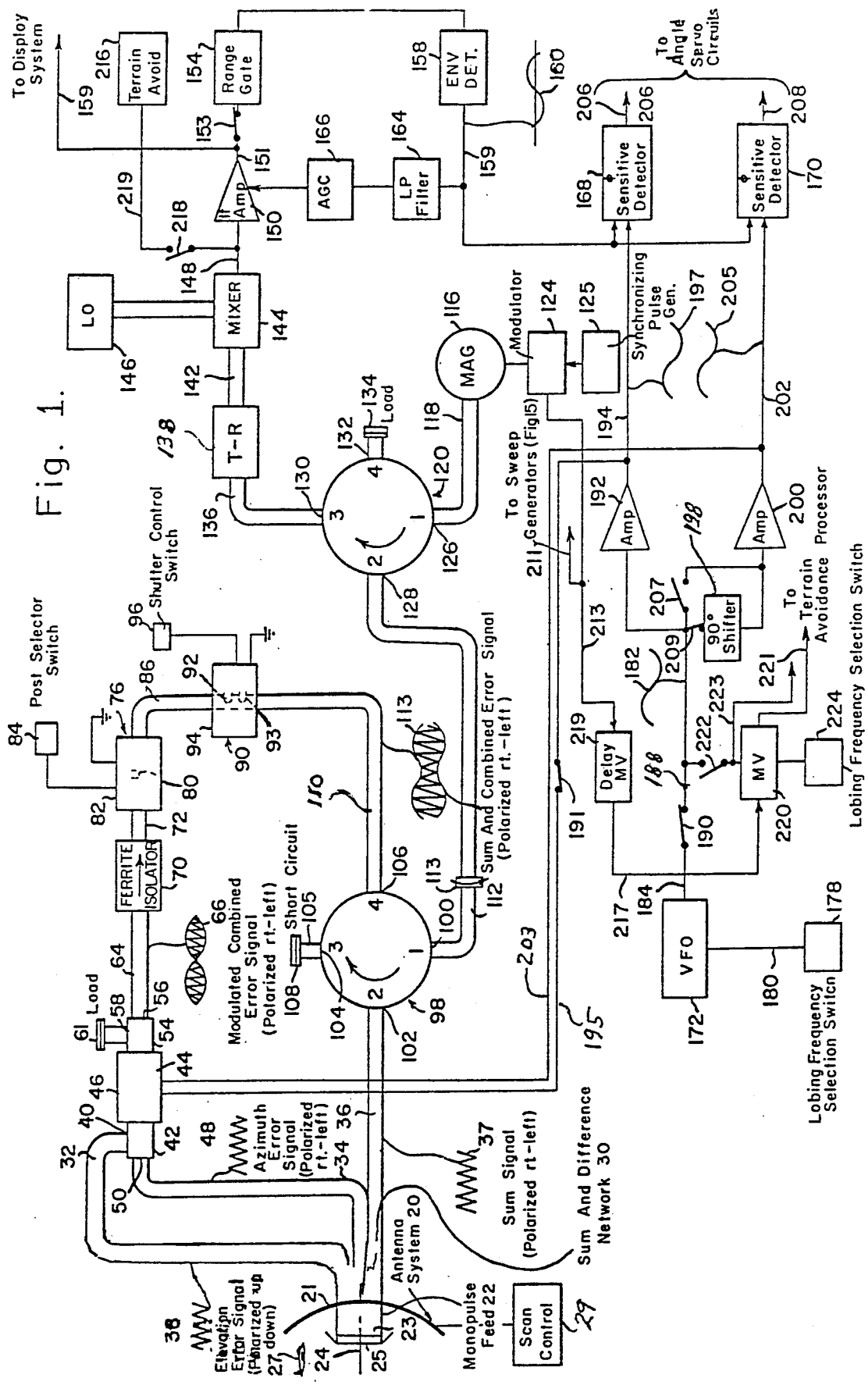
FIG. 1 is a schematic and block diagram of a radar system in accordance with this invention utilized as a conventional pulsed radar system.

Referring first to FIG. 1, a schematic and block diagram is shown of a radar system in accordance with this invention when operating as a conventional pulsed radar system. It is to be noted that the operation of the system in accordance with this invention is similar for continuous wave signals and the principles of the invention are equally applicable to both pulsed and continuous wave operation.

A monopulse antenna system 20 receives echo signals reflected from an object in space such as a craft 27 in a monopulse feed 22 which may have four apertures 23 at the end thereof. A splash plate 25 is provided to direct the energy into or out of the four apertures. The antenna system 20 may have a central axis 24 indicative of the axis of a parabollic reflector or dish 21 and which is the bore-sight axis. The signals intercepted by the group of apertures 23 have relative amplitudes which together are indicative of the azimuth and elevation direction of a target in relation to the axis 24. These signals are passed through a sum and difference network 30 which may, for example, by a conventional network including a plurality of magic tees.

As is well known in the art, the monopulse feed 22 may include four magic tees with the input arms of the first magic tee connected to the top two apertures and the input arms of the second magic tee connected to the bottom two apertures. The shunt arms of the first and second magic tees are connected to the two input arms of the third magic tee and the series arms of the first and second magic tees are connected to the input arms of the fourth magic tee. The sum signal is applied to the shunt arm of the third magic tee and the elevation difference signal is applied to the series arm of the third magic tee. The azimuth difference signal is applied to the shunt arm of the fourth magic tee. A dissipative load may be connected to the series arm of the fourth magic tee. It is to be noted that in the first two magic tees discussed above, the error signals at the series arm change polarity for signals above and below the axis 24 in the vertical plane and for signals to the right and left of the axis 24 in the azimuth plane. These polarity changes and others in the waveguides determine the polarities for any quadrant in space relative to the axis 24. Energy applied to the shunt arm of the third magic tee during transmission is passed equally out of all four apertures of the monopulse feed 22. As this type of sum and difference network is well known in the art, it will not be explained in further detail.

Thus the sum and difference network 30 in response to the intercepted signals from the apertures 23 combine the four intercepted signals into an elevation difference error signal which is applied to a rectangular waveguide 32, an azimuth difference error signal which is applied to a rectangular waveguide 34 and a sum or reference signal which is applied to a rectangular waveguide 36. The two error signals and sum signal are all at the transmitted frequency which may include radio or microwave frequency or any other appropriate frequency.

The antenna system 20 may scan in response to a scan control servo 29 which may provide a rectangular scan pattern during search operation and azimuth scanning during terrain avoidance operation. During tracking the scan control servo 29 may be controlled in response to processed error signals.

The elevation error signal shown by a waveform 38 and having electric vectors polarized in a first direction which is up-down looking into a cross section of the waveguide in the plane of the figure, is applied through the waveguide 32 to a first input waveguide section 40 of an orthogonal mode transducer or coupler 42 included in a modulator 46. The elevation error signal is then applied to a modulating section 44 of the modulator 46 polarized vertically or up-down in a plane transverse to the longitudinal axis of the modulator 46. The azimuth error signal shown by a waveform 48 and having electrical vectors polarized right-left is applied through the waveguide 34 to a waveguide section 50 of the coupler 42 and applied into the modulating section 44 polarized right-left or at right angles to the elevation error signal. Thus the elevation error and the azimuth error signals are applied to the modulating section 44 in space quadrature.

The modulator 46 which may be a ferrite modulator includes a circular section of waveguide that contains a rotating magnetic field as will be discussed in further detail subsequently. Any component having energy that is in line with this field will be continuously rotated at the output and any components having electric vectors 90 degrees from the plane of the magnetic field are not affected. The output energy of the circular modulating section 44 is applied to a rectangular waveguide section 56 of a coupler 54 that accepts only output polarization that is in line with its narrow dimension. The component of the energy that is not accepted by the rectangular waveguide 56 is applied to a second rectangular waveguide section 58 for dissipation in a dummy load 61. Thus the signal of a waveform 66 is applied to a waveguide 64, being amplitude modulated at a frequency dependent on the frequency of rotation of the magnetic field of the modulator 46. The modulated signal of the waveform 66 is then applied through an isolator 70 to a waveguide 72.

The isolator 70 may be any conventional non reciprocal type such as a ferrite device utilizing either the principle of resonant absorption or the principle of the Faraday effect of rotation of the plane of polarization of plane polarized electromagnetic waves. For example, a Faraday effect attenuator that may be utilized for the isolator 70 is described in U.S. Pat. No. 2,748,353, "Non-Reciprocal Wave Guide Attenuator" invented by C. L. Hagand and issued May 29, 1956. Also Faraday rotation isolators are generally described in an article in Bell System Technical Journal, Volume XXXIV, January, 1955, pages 5-103 entitled "Behavior and Applications of Ferrites in the Microwave Region," and written by A. G. Fox, S. E. Miller and M. T. Weiss. Also a four port circulator may be utilized for the isolator 70 by coupling the first and second ports to the respective waveguides 64 and 72 and coupling the third and fourth ports to suitable load terminations as is well known in the art.

The isolator 70 has the property of passing energy from the waveguide 64 to the waveguide 72 with substantially negligible attenuation and of absorbing energy applied thereto from the waveguide 72 so that substantially no energy is transmitted to the waveguide 64.

The modulated combined error signal of the waveform 66 is then applied through the waveguide 72 to a capacitive post summing unit 76 which, as will be explained in further detail subsequently, includes a post 80 that may be inserted into the center of the waveguide 72 at selected depths to vary the amounts of reflected and transmitted energy. The capacitive post unit 76 may include a solenoid 82 controlled by a switch 84 to selectively move the post 80 to an extended 3 db (decibel) reflection position or to a retracted 10 db reflection position, for example. The post 80 provides summing of selected portions of the error signal of the waveform 66 and of selected portions of the sum signal of the waveform 48. It is to be noted that other reflective arrangements such as an inductive post may be utilized in accordance with the principles of this invention.

The post unit 76 is coupled to a waveguide 86 which in turn is coupled to a waveguide shutter 90 which may have a pair of posts 92 and 93 positioned transverse to the longitudinal axis of the waveguide and at right angles to the wide dimension of the waveguide. The posts 92 and 93 may be extended into the waveguide substantially all of the narrow dimension to provide total reflection of energy applied thereto. When the posts 92 and 93 are withdrawn from the waveguide, substantially no attenuation is provided. A solenoid 94 and a selective shutter control switch 96 may be provided for selectively opening and closing the shutter posts. The shutter 92 may be any conventional type as well known in the art and may have posts as shown or a relatively thick vane as disclosed in Ser. No. 694,044, "Switching Device for Waveguide Transmission Systems", by Waldon P. Bollinger et al published Nov. 21, 1950 in the Official Gazette at pages 1032 and 1033.

The system in accordance with this invention includes a circulator 98 which may be a conventional four port ferrite circulator as will be explained in further detail subsequently. The circulator 98 may include first, second, third and fourth ports 100, 102, 104 and 106 respectively. The second port 102 may be coupled to the waveguide 36, the third port 104 coupled to a short circuit termination 108 through a variable length section of waveguide 105, the fourth port coupled to a waveguide 110 which is also coupled to the shutter 92 and the first port 100 coupled to a waveguide 112.

During reception, the sum signal of the waveform 37 is applied to the port 102, reflected from the short circuit 108 and applied to the waveguide 110 to either be reflected by the shutter 92 during search operation, or during conventional or anti-jam tracking operation, to have a selected portion reflected by the capacitive post 80 with the transmitted portion absorbed in the isolator 70. At the same time a portion of the modulated error signal information of the waveform 66 is transmitted through the post 80 to be combined or summed with the sum signal while the reflected portion is absorbed in the isolator 70. When the shutter 92 is closed during search operation, the error signal information is reflected from the shutter until it is totally absorbed in the isolator 70. This during a search operation, the total sum signal is reflected back into the port 106 and applied to the waveguide 112.

The distance between the four apertures 23 to the summing point of the capacitive post 80 must be equal for all energy paths so that all signals are summed in proper phase relation. These three paths include the elevation error signal path through the waveguide 32, the modulator 46, and the waveguides 64 and 72 tot he post 80, the azimuth error signal path through the waveguide 34, the modulator 46, and the waveguides 64 and 72 to the post 80 and the sum signal path through the waveguide 36, the circulator 98 including the waveguide section 105, and the waveguides 110 and 86 to the post 80. The variable length waveguide section 105 provides a convenient arrangement for final adjustment of the length of the sum signal path.

During transmission, energy developed by a magnetron 116 is applied to a waveguide 118 through a circulator 120 to the waveguide 112, to the port 100 of the circulator 98, to the waveguide 36 and through the sum and difference network 30 to be transmitted from the dish 21 into space. The transmit-receive portion of the system includes a modulator 124 coupled to the magnetron 116 for applying pulsed bursts of energy to the circulator 120. It is to be noted that for C.W. (continuous wave) operation in accordance with the invention, the magnetron 116 may be continually operating. The modulator 124 responds to pulses applied from a synchronizing pulse generator 125. The circulator 120 includes first, second, third and fourth ports respectively designated as ports 126, 128, 130 and 132. The port 126 is coupled to the waveguide 118 and the port 128 is coupled to the waveguide 112. The port 132 may be coupled to a suitable microwave dissipative load 134 and the port 130 is coupled to a waveguide 136 in which the combined signal of the waveform 113 is applied to a transmit-receive tube 138. A conventional gas type tube may be utilized for the T-R tube 138 to prevent higher level transmitted energy from passing therethrough. The transmit-receive tube 138 is required to prevent reflections from damaging the IF processing arrangement which may result from mismatched impedances in the microwave portion of the system. It is to be noted that the waveguide 112 may include a rotary joint 113 when the microwave modulating system is fixedly mounted to a movable antenna. Thus in this type of antenna arrangement, the system in accordance with this invention requires only one rotary joint.

The intercepted energy passed through the transmit-receive tube 138 is applied through a waveguide 142 to a mixer 144 controlled by a local oscillator 146 to apply signals at intermediate frequency to a lead 148. The common IF (intermediate frequency) signal on the lead 148 (not shown) is applied to a common IF amplifier 150 thus eliminating the well known phase and amplitude balancing problems associated with a conventional plurality of parallel IF amplifiers.

The amplified signal from the IF amplifier 150 is passed through a lead 151 and a switch 153 to a speed gate or range gate 154 which, as is well known in the art, may be a servo controlled frequency tracking loop which translates the common signal to the pass band of a speed gate or range gate filter (not shown). In a conventional pulsed system the range gate discriminates the target as a function of time. In a pulsed doppler system, this speed gate filter is a narrow band filter which separates the desired error signal from undesired signals received by the antenna system 21, such as clutter signals. The common IF signal passed through the range gate 154 is then passed to a conventional envelope box car detector 158 which shifts the carrier wave or the sum signal to a DC (direct current) signal for providing a DC reference level of a waveform 160 on a lead 159 while retaining the sideband information at the amplitude modulation frequency of the envelope of the common signal similar to the waveform 113. The DC signal of the waveform 160 is then passed through a low pass filter 164 which essentially passes only the DC signal to an automatic gain control (AGC) circuit 166. The automatic gain control circuit 166 acts in a conventional manner to vary the amplification of the IF amplifier 150 so as to normalize the amplification in response to the varying peak amplitude of the DC reference or sum signal. Thus the sum signal of the waveform 37 is utilized to provide the reference amplitude for the error signals developed by the sum and difference network 30. The detected sideband error signal of the waveform 160 is passed simultaneously to phase sensitive detectors 168 and 170. The IF signal on the lead 151 may be applied to the display system (not shown) through a lead 159. For search operation, the switch 153 is opened and the sum signal is applied only to the lead 159.

In order to provide a variable lobing or modulation frequency, a suitable source of AC (alternating current) signals is provided such as a variable frequency oscillator 172 controlled by a lobing frequency selection switch 178 through a lead 180. The switch 178 may control the reactance of the variable frequency oscillator 172, for example. The oscillator 172 applies a reference signal of a waveform 182 to a lead 184 having a frequency determined by the selection switch 178 to provide a varying lobing frequency so as to overcome the effect of interfering signals such as jamming signals intercepted by the antenna. The signals on the lead 184 are applied to a lead 188 through a switch 190 and through a first power amplifier 192 to a lead 194. Also signals are applied from the lead 188 through a 90 degrees phase shifter 198 and through a second power amplifier 200 to a lead 202. The reference and modulation control signals on the leads 194 and 202 shown by waveforms 197 and 205 are applied through respective leads 195 and 203 to the polyphase ferrite rotating element 44 of the modulator 46 and are respectively applied to the phase sensitive detectors 168 and 170. In response to the reference signals on the leads 194 and 202 the respective phase sensitive detectors 168 and 170 each separate the in phase elevation and azimuth error components from the detected error signal of the waveform 160 so as to develop DC output signals (not shown) on output leads 206 and 208.

As will be explained in detail subsequently, the DC output signals have voltage levels indicative of the relative peak amplitudes of the modulated elevation and azimuth error signal components of the detected error signal of the waveform 160. The DC error signals on the leads 206 and 208 are then passed to angle servo circuits (not shown) which may act to control the guidance of a craft or the direction of the antenna system 20 by applying signals to the scan control servo 29, for example.

Figure 15:
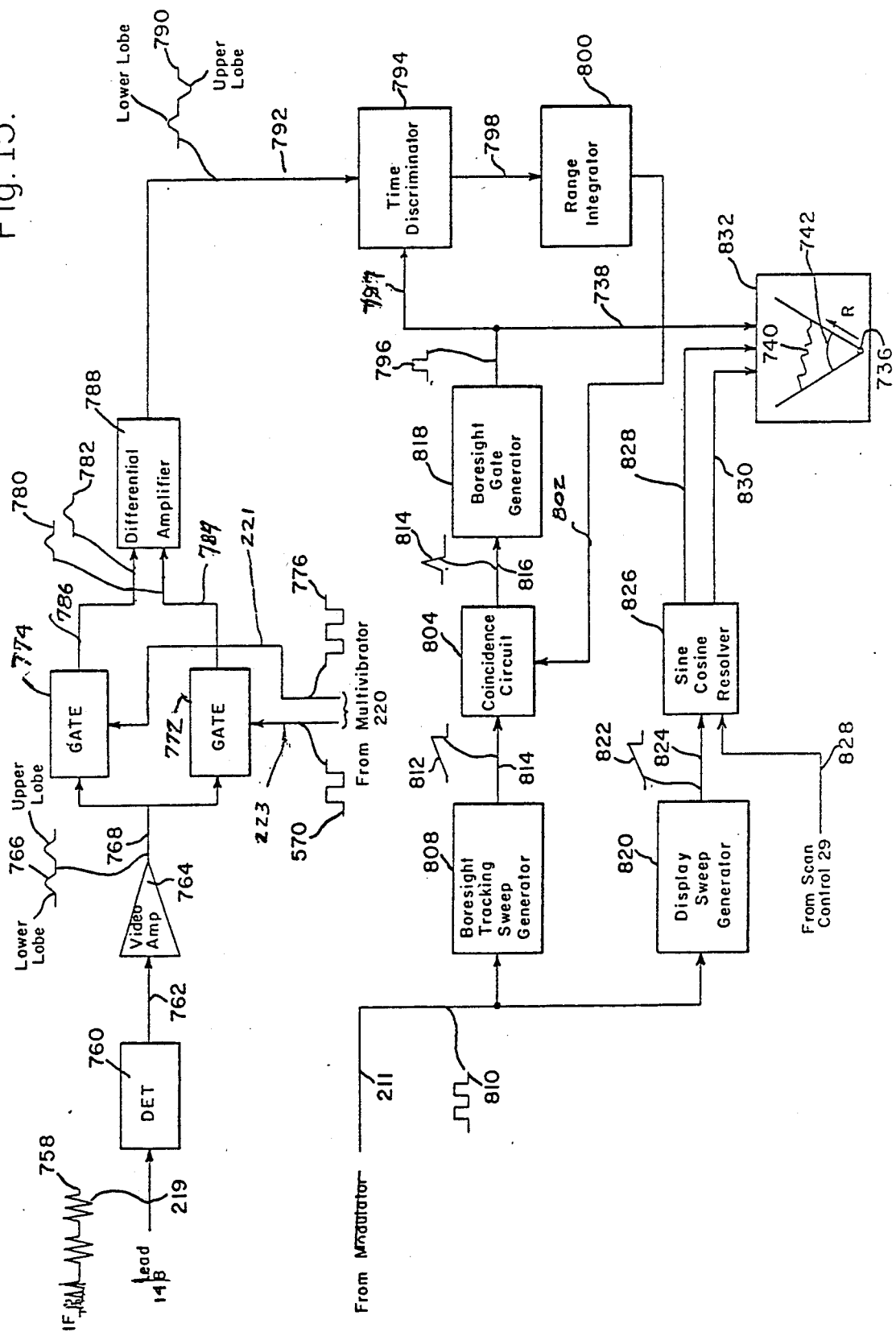
FIG. 15 is a schematic block diagram of the terrain avoidance processor system in accordance with this invention.

In the terrain avoidance operation in accordance with this invention only the elevation error signal of the waveform 38 is effective as the azimuth energy is dissipated in the load 61 by driving the modulator 46 with a single square wave reference signal at a selected peak amplitude. Thus a switch 191 is included in the lead 195 so as to disconnect one square wave reference signal during terrain avoidance operation. Also a switch 207 is connected between the lead 188 and the amplifier 200 and a switch 209 is provided to disconnect the phase shifter 198. A terrain avoidance processor 216 may be coupled through a lead 219 and a switch 218 to the lead 148. The processor 216 shown in FIG. 15 may be of the type that responds to a signal representing the sum signal plus the error signal at a first phase and the sum signal plus the error signal at a second phase or inverted, as will be discussed subsequently. The inverting of the elevation error signal applied to the modulator 46 is performed by a square pulse of a waveform 570 (FIG. 12) applied from a multivibrator 220 through a switch 222 to the lead 188. The frequency of the multivibrator 220 may be controlled by a lobing frequency selection switch 224 to vary a selected timing circuit of the multivibrator 220 as is well known in the art. The multivibrator 220 is synchronized by a delayed pulse applied from a delay multivibrator 219 through a lead 217. The delay multivibrator 219 is controlled by a signal applied from the modulator 124 through a lead 213. A lead 211 applies trigger pulses from the lead 213 to a lead 211 which controls sweep generators in the terrain avoidance processor (FIG. 15). Leads 221 and 223 apply the square wave signals to the terrain avoidance processor 216 of FIG. 15 to provide a gating operation.

Figure 2:
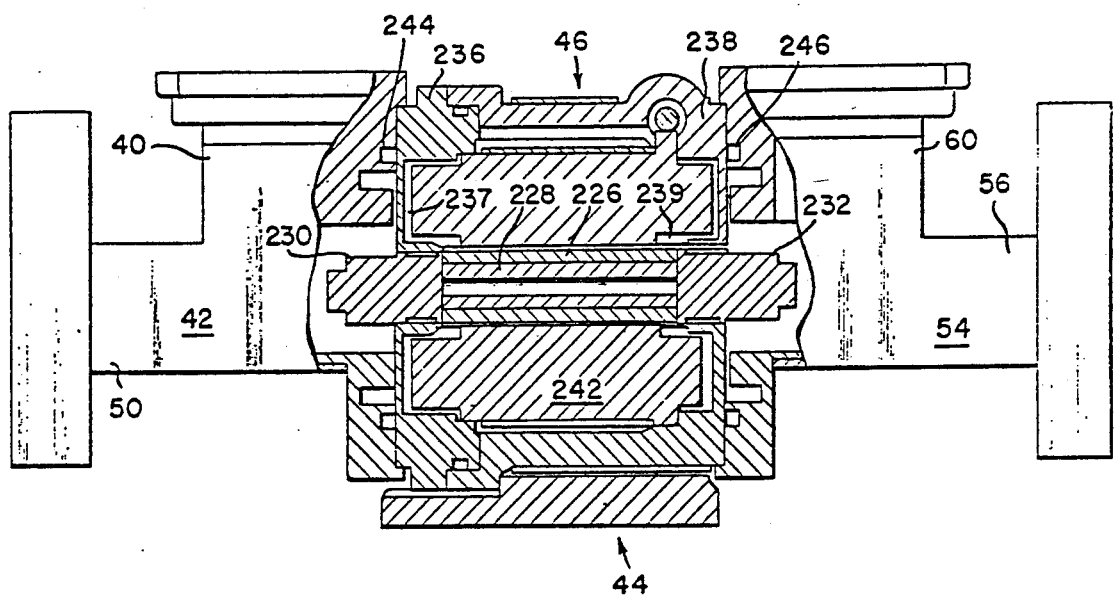
FIG. 2 is a plan view of the ferrite modulator of FIG. 1 with portions broken away for further clarity.

Referring now to FIG. 2 which is a partially broken plan view of the ferrite modulator 46, the structure thereof will be explained in further detail. The coupler 42 which is an orthogonal mode transducer couples the unmodulated elevation and azimuth error signals into a common waveguide signal. Because the narrow dimensions of the waveguide section 50 and the wide portion of the waveguide section 40 are horizontal, the polarity of the respective azimuth and elevation electrical vectors are combined in rotational space quadrature. The combined error signal is then applied to a ferrite cylinder 226 having a suitable internal supporting cylinder 228 which may be formed of a dielectric plastic material. A pair of impedance matching dielectric plugs 230 and 232 are abutted against opposite ends of the ferrite cylinder 226 within suitable cylindrical supporting structures 236 and 238. The plugs 230 and 232 are selected to provide impedance matching or signals entering and leaving the rotating section 44. A pair of cylindrical flange shaped supporting structures 237 and 239 may be provided. The cylinder 228 may develop sufficient dielectric loading so that the ferrite cylinder 226 may operate at X band frequency, for example.

Surrounding the ferrite cylinder 226 is a cylindrical two phase winding array 242, wound in a conventional polyphase fashion to have eight magnetic poles, for example. The polyphase winding array 242 which is similar to the stator of a conventional motor, is supported by the structures 236, 238, 237 and 239 and has four leads connected to a suitable external terminal (not shown).

The angularly rotated error signals are applied from the ferrite modulating section 44 to the orthogonal mode transducer or coupler 54. The waveguide section 56 of the coupler 54 has the narrow dimension in a horizontal position in FIG. 2 so that only the components of the error signal in the horizontal or right-left plane are accepted thereby. The waveguide section 60 accepts error signal components in the up-down plane in the view of FIG. 2 which are absorbed by the dissipative load 61 of FIG. 1. The couplers 42 and 54 are attached to the modulating section 44 by welding or with flanges, for example, and may include rings 244 and 246 abutted against the respective structures 236 and 238.

Figure 3:
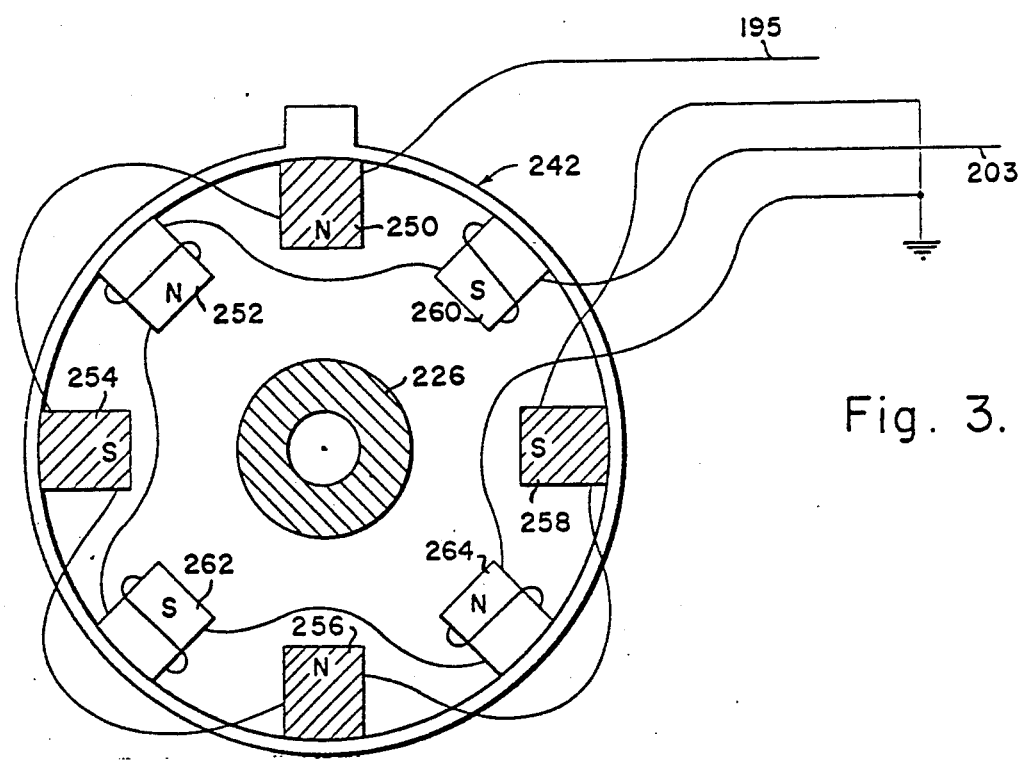
FIG. 3 is a partially schematic cross sectional drawing of the ferrite modulator of FIG. 2.

Referring now also to FIG. 3 which is a partially schematic cross sectional drawing of the modulation section 44, the arrangement of the polyphase rotating field will be further explained. The field windings 242 include a plurality of poles such as 250 and 252 for illustrative purposes but it is to be understood that the poles may be formed by the arrangement of the wire coils as is well known in the motor field art. The lead 195 at the instant shown forms a north pole 250, south pole 254, north pole 256 and south pole 258 and is connected to a suitable source of reference potential thereat such as ground. The lead 203 at the instant shown forms a south pole 260, north pole 252, south pole 262 and north pole 264 also being connected thereat to a suitable source of reference potential such as ground. The poles coupled to the leads 195 and 202 are alternately spaced so that the field applied to the ferrite cylinder 226 continually rotates. For example as the strength of the north pole 252 increases, the strength of the north pole 250 decreases to rotate the magnetic field in a counter clockwise direction. The magnetic field with the poles illustrated at a particular instant may pass from the poles 250 and 252 to the poles 254 and 262 as well as to the poles 258 and 260. Also the magnetic field may pass from the poles 256 and 264 to the poles 258 and 260 as well as to the poles 254 and 262 to provide a continuous field around the ferrite cylinder 226, which field rotates in response to the reference signals of the waveforms 197 and 205 (FIG. 1) applied to the leads 195 and 203. It is to be noted that other polyphase rotating field arrangements may be used in accordance with the principles of this invention.

Figure 4:
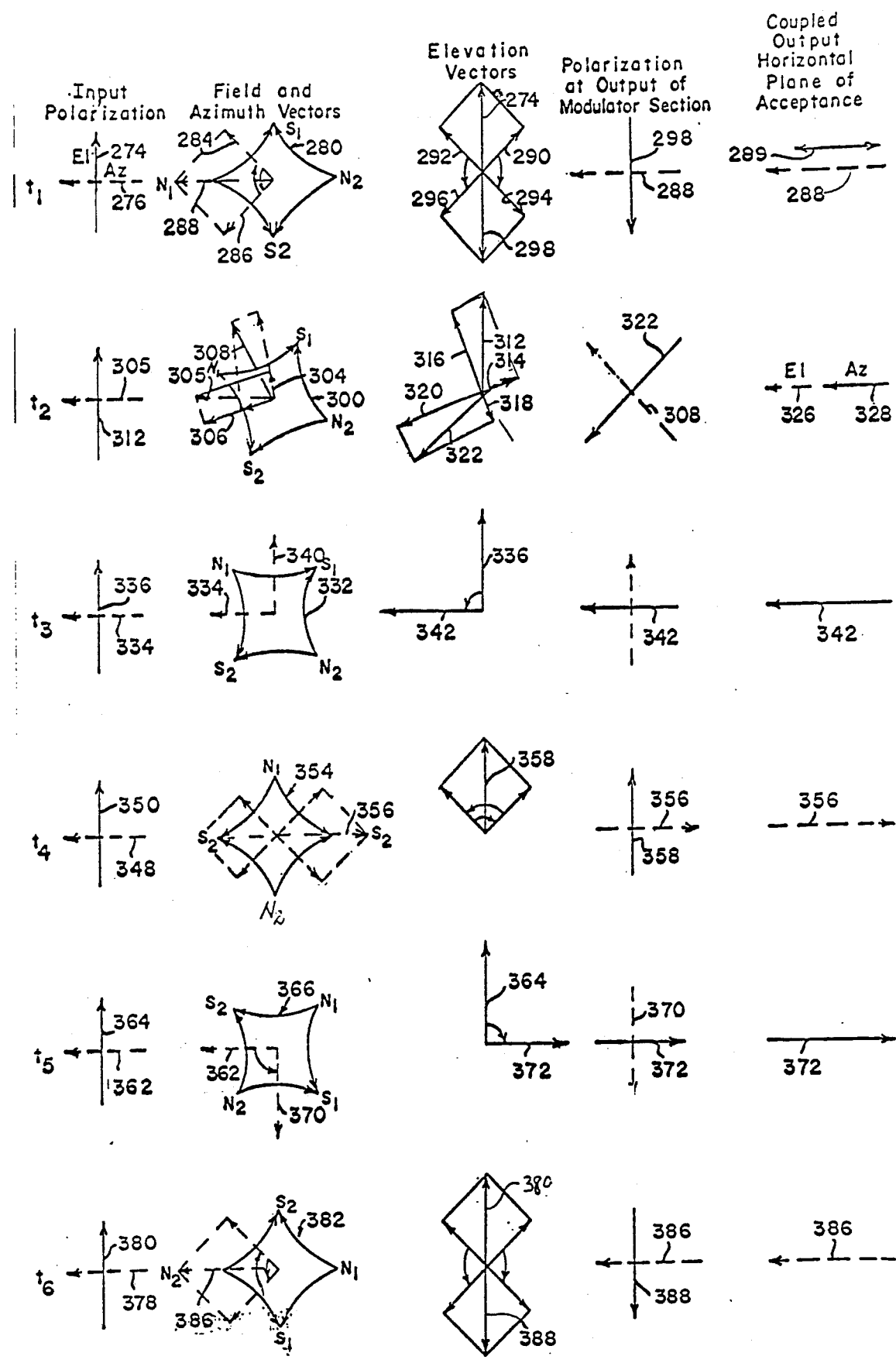
FIG. 4 is a schematic diagram of vectors and the rotating magnetic field for explaining the operation of the ferrite modulator of FIGS. 1 and 2.

Referring now to FIG. 4 as well as to FIGS. 1 and 2 the operation of the ferrite modulator 46 will be explained in further detail. The polarized input vectors in space quadrature applied to the modulating section 44 such as shown by an elevation vector 274 and a dotted azimuth vector 276 at time $t_1$ are assumed to have equal amplitude for illustrative purposes. This condition is provided by an echo return from an object at an equal angle from the axis 24 (FIG. 1) in both azimuth and elevation. The sum and difference network 30, the waveguides 32 and 34 and the coupler 42 determine the polarities of the vectors 274 and 276 for the quadrant of the scan area in which the object is located relative to the axis 24. The magnetic field developed by the winding 242 is shown at a time $t_1$ by a circular field arrangement 280. It is to be noted at this time that the relative phase and amplitude of the reference signals 197 and 205 to develop the rotating fields illustrated in FIG. 4 is shown at times $t_1$ to $t_6$ by the waveforms of FIG. 8.

Before further explaining the rotation of the field and vectors the operation of the ferrite in a circularly rotating field will be further explained. The permeability properties of a ferrite in a magnetic field are well known. The normal modes in a ferrite in a transverse magnetic field are a pair of linearly polarized waves. The ferrite modulator in accordance with this invention depends on the birefringent effect of the ferrite in the transverse magnetic field for its operation. A wave incident on the ferrite cylinder 226 may be considered as two linearly polarized waves with polarization vectors at right angles to each other and corresponding to two $TE_{11}$ modes. These two waves have different phase velocities so that the polarization of the incident signal may be rotated. By rotating the magnetic field at the modulating frequency and utilizing the coupler 54 at the output which is sensitive to waves of a certain polarization, the signal at the output is an amplitude modulated signal. Because the input signals have their electrical vectors in space quadrature, the modulated signals at the output of the ferrite modulating section 44 are also in space quadrature and are accepted out of phase by the polarized output of the coupler 54.

The rotation of the vectors of the input signals and their relative phase velocities may be determined at any instant of time by applying a suitable phase shift convention to the field representation such as 280. The rotational position of the field such as 280 is determined by the phase and amplitude relations of the reference signals of the waveforms 197 and 205 as explained relative to FIG. 3. At time $t_1$, the incident azimuth electrical vector 276 may be represented by vectors 284 and 286 parallel to the linear axis of the field and unaffected by the field forces at right angles thereto. To determine the effect of the ferrite on these vectors at any instant of time, each vector is rotated +90 degrees when the field arrow on the vector's right is up or in the same direction as the vector and the field arrow on the vector's left is down or in the opposite direction from that of the vector. Also each vector is rotated −90 degrees when the field arrow on the vector's right is down or in the opposite direction from that of the vector and the field arrow on the vector's left is up or in the same direction as the vector. Thus at time $t_1$, the vector component 284 is rotated +90 degrees (counterclockwise) to the position of the vector 286 and the vector 286 is rotated −90 degrees (clockwise) to the position of the vector 284. Therefore at the rotational angle position of the field 280 at time $t_1$ the azimuth vector 2767 is effectively not rotated as shown by the resultant azimuth vector 288.

The elevation vector 274 may be represented by vector components 290 and 292 at right angles to each other and parallel to the fields of force. The vector component 290 is rotated −90 degrees as shown by the vector component 294 and the vector component 292 is rotated +90 degrees as shown by the vector component 296. The resultant position of the elevation vector provided by the field 280 is shown by a vector 298 which has been rotated 180 degrees from the incident vector 274. At time $t_1$ all of the azimuth vector 288 is accepted by the coupler 54 having a plane of acceptance 289 and applied to the waveguide 64. At this time, none of the elevation vector 298 is applied to the waveguide 64 but all of the energy of the elevation vector 298 is applied to the waveguide section 60 and absorbed by the load 61. This same convention may be utilized to determine the resultant vectors at any instant of time or rotational position of the field.

At time $t_2$, the magnetic field has rotated approximately 22.5 degrees as shown by a field 300 in response to the signals of the waveforms 197 and 205. The azimuth vector components that are parallel to the magnetic fields are shown by dotted vector components 304 and 306 of the incident vector 305. Following the above convention, the vector component 304 is rotated +90 degrees to the angular position of the component 306 and the vector component 306 is rotated −90 degrees to the angular position of the vector 304. The resultant is a vector 308 having the same amplitude as the input vector 305. The elevation input vector 312 is also broken down into vector components 314 and 316 parallel to the fields of force. The vector component 314 is rotated −90 degrees as shown by a vector component 318 and the vector 316 is rotated +90 degrees as shown by the vector component 320. The result of the rotation of the elevation vector 312 at time $t_2$ is shown by a vector 322. The coupler 54 responds to the vectors 308 and 322 to apply elevation and azimuth vectors 326 and 328 to the waveguide 64 polarized in the plane of acceptance 289.

At time $t_3$ the magnetic field has rotated to the position shown by the field 332 so as to be parallel to the input azimuth and elevation vectors 334 and 336. The vector 334 is rotated −90 degrees and the vector 336 is rotated +90 degrees to form the respective vectors 340 and 342. Thus in the position of the field 332, components of the input vectors are not involved. The azimuth and elevation vectors 340 and 342 are applied to the coupler 54 with all of the energy of the elevation vector 342 being applied to the waveguide 64.

At time $t_4$, azimuth and elevation input vectors 348 and 350 are applied to a rotated field 354 to form the resultant azimuth and elevation vectors 356 and 358 by rotating the vector components in accordance with the above discussion. All of the energy represented by the azimuth vector 356 is applied to the waveguide 64 and all of the energy represented by the vector 358 is absorbed in the load 61.

At time $t_5$, azimuth and elevation vectors 362 and 364 are again parallel to the lines of force of a field 366 and resultant vectors 370 and 372 are formed by the ferrite as a result of a respective +90 degrees and −90 degrees rotation of the vectors 362 and 364. The elevation vector 372 passes through the plane of acceptance 289. At time $t_6$, azimuth and elevation vectors 378 and 380 in space quadrature are applied to a field 382 to form resultant azimuth and elevation vectors 386 and 388 in space quadrature. The azimuth vector 386 is passed through the plane of acceptance 289 of the coupler 54.

Thus, the components of the input vectors are rotated at different angular velocities as the field rotates to provide resultant vectors that rotate at the angular velocity of the field. This rotation is continuous for both input vectors arranged in space quadrature and the plane of sensitivity of the output coupler 54 applies elevation and error signals therethrough · amplitude modulated 90 degrees out of a phase from each other, which phase·difference is utilized to detect the individual error signals in subsequent portions of the receiver system. As may be seen in FIG. 8, the modulated azimuth error signal of a waveform 390 is formed from the coupled output vectors 288, 326, 356 and 386 at respective times $t_1$, $t_2$, $t_4$ and $t_6$ with no azimuth error signal vector being coupled out at times $t_3$ and $t_5$. The modulated elevation error signal of a waveform 394 is formed from the coupled output vectors 328, 342 and 372 at respective times $t_2$, $t_3$ and $t_5$ with no elevation energy being coupled out at times $t_1$, $t_4$ and $t_6$. The modulation of the error signals of the waveforms 390 and 394 are in phase with the respective reference signals of the waveforms 197 and 205. As shown by the waveform 66 (FIG. 9) the combined error signal in the waveguide 64 has a phase and amplitude determined by the resultant of both of the elevation and azimuth vectors in the plane of acceptance 289.

In the terrain avoidance mode of operation, only the elevation vector is utilized and this vector is continuously inverted in response to a square wave reference signal. It is to be noted that at times $t_3$ and $t_5$ the elevation signal is inverted and no azimuth vector is coupled through the plane of acceptance 289. Also at times $t_3$ and $t_5$ the reference signal of the waveform 197 is zero. Thus by applying a square wave to the modulator 46 having the positive and negative amplitudes of the waveform 205 at times $t_3$ and $t_5$, the elevation vector may be alternately inverted for the terrain avoidance mode, as will be discussed in further detail subsequently.

Referring now to the elevation view of FIG. 5 and to the side view of FIG. 6 of the variable capacitive post unit 76, the operation of the system elements will be explained in further detail. The capacitive post unit 76 includes a rectangular waveguide section 400 into which the post 80 is inserted. The solenoid 82 moves the post to a 10 db reflection position (shown solid) or to a 3 db reflection position 402 (shown dotted). Suitable terminals of the solenoid 82 are coupled to ground and to the switch 84 of FIG. 1. Flanges 404 and 406 are provided for joining with respective waveguides 72 and 86. In the 3 db position the capacitive post 80 reflects half of the microwave energy that is applied thereto from either direction. The half of the energy not reflected is passed therethrough. The post 80 provides a direct algebraic summation of the error signal passed therethrough and of the reflected sum signal. The portions of the sum signal passed therethrough and of the error signal reflected therefrom are absorbed in the isolator 70. The capacitive post 80 is utilized in the 3 db reflection position during tracking when substantially half of the total error signal is desirable.

When it is impossible to avoid noise or C.W. jamming by the silent lobing and changing lobing frequency in accordance with this invention, the steering signals will be highly erratic and unreliable. Under these conditions, the capacitive post 80 is moved to the 10 db reflection position indicated by the dotted position 402. This 10 db position passes, for example, nine tenths of the error signal energy while reflecting one tenth of the error signal energy and passes nine tenths of the sum signal energy while reflecting one tenth of the sum signal energy. In the presence of this type of jamming by the target craft, for example, the jamming signal is modulated and it is desired to increase the percentage of modulation of the error signal. Thus the percentage of the total sum energy is decreased and the percentage of the error energy is increased. Therefore, the sum signal is greatly reduced when the post 80 is in the 10 db position for an increased percentage of modulation of the error signal. It is to be noted that although an inductive type post may be utilized, in accordance with this invention the capacitive post 80 which is loss free, has the advantage of ease of construction.

As discussed previously, the shutter 90 may be either a vane type or a post type. The arrangement of FIGS. 5 and 6 may be utilized for the shutter 90 with dotted posts 92 and 93 provided instead of the post 80. The posts 92 and 93 may be in an inserted position shown when closed or completely withdrawn from the waveguide when open. The solenoid 82 is adjusted to provide these two positions. The posts 92 and 93 are separated by a selected distance along the axis of the waveguide 400 so that substantially total reflection is provided. As is well known in the art, the shutter 90 is essentially a short circuit device.

Referring now to FIG. 7 the ferrite circulator 98 will be explained in further detail in accordance with this invention. The circulator 98 includes a magic tee 412, a phase shift section 414, a narrow wall 3 db coupler 416 and a waveguide section 418. The phase shift section 414 includes permanent magnets 420 and 422 applying fields to the top and bottom of respective elongated ferrite bars 424 and 426 to provide 45 degree phase shift of energy incident thereon or a differential phase shift of 90 degrees. Each ferrite bar 424 and 426 is in separate waveguide sections 430 and 432 separated by a common wall 434.

In operation of the circulator, microwave energy incident upon the first port 100 divides equally in magnitude and phase in the waveguide sections 430 and 432 of the phase shift section 414. The energies undergo a relative phase shift of +45 degrees in the waveguide section 430 and −45 degrees in the waveguide section 432. Therefore, the energy enters the narrow wall coupler 416 with relative phase shifts of +45 degrees and −45 degrees as shown by the dotted lines 436 and 438. The ferrite is located at the point of circular polarization in the rectangular waveguide sections 430 and 432 and the microwave currents set up in the walls are themselves shifted in phase which in turn provides the shifts of the microwave fields. In a single mode waveguide the ferrite loaded medium may be non-reciprocal because of the different phase constants for the two directions of transmission. The currents resulting from the H field loops at the surface of the waveguide causes a differential phase shift because the permeability of the ferrite will perturb unequally the phase constants for the two directions. The ferrite is maintained in a transverse magnetic field to provide a desired difference of phase velocity. This operation of the ferrite is well known in the art as discussed in the above referenced Bell System Technical Journal and will not be explained in further detail. In the narrow wall coupler 416 the energies undergo phase shifts as indicated by the solid paths 440 and 442. The energies entering the fourth port 106 from the waveguide sections 430 and 432 are 180 degrees out of phase (+45 degrees and −135 degrees) so that the resultant energy is zero. However at the second port 102 energies arriving are in phase (both −45 degrees). Therefore all of the power entering the first port 100 arrives at the second port 102. A similar analysis may be performed for power entering the second port 102 which will arrive at the third port 104, for power entering the third port 104 which will arrive at the fourth port 106 and for power entering the fourth port 106 which will arrive at the first port 100. As this type of circulator is well known in the art, it will not be explained in further detail. The circulator 120 of FIG. 1 may be similar in construction to the circulator 98.

Figure 8:
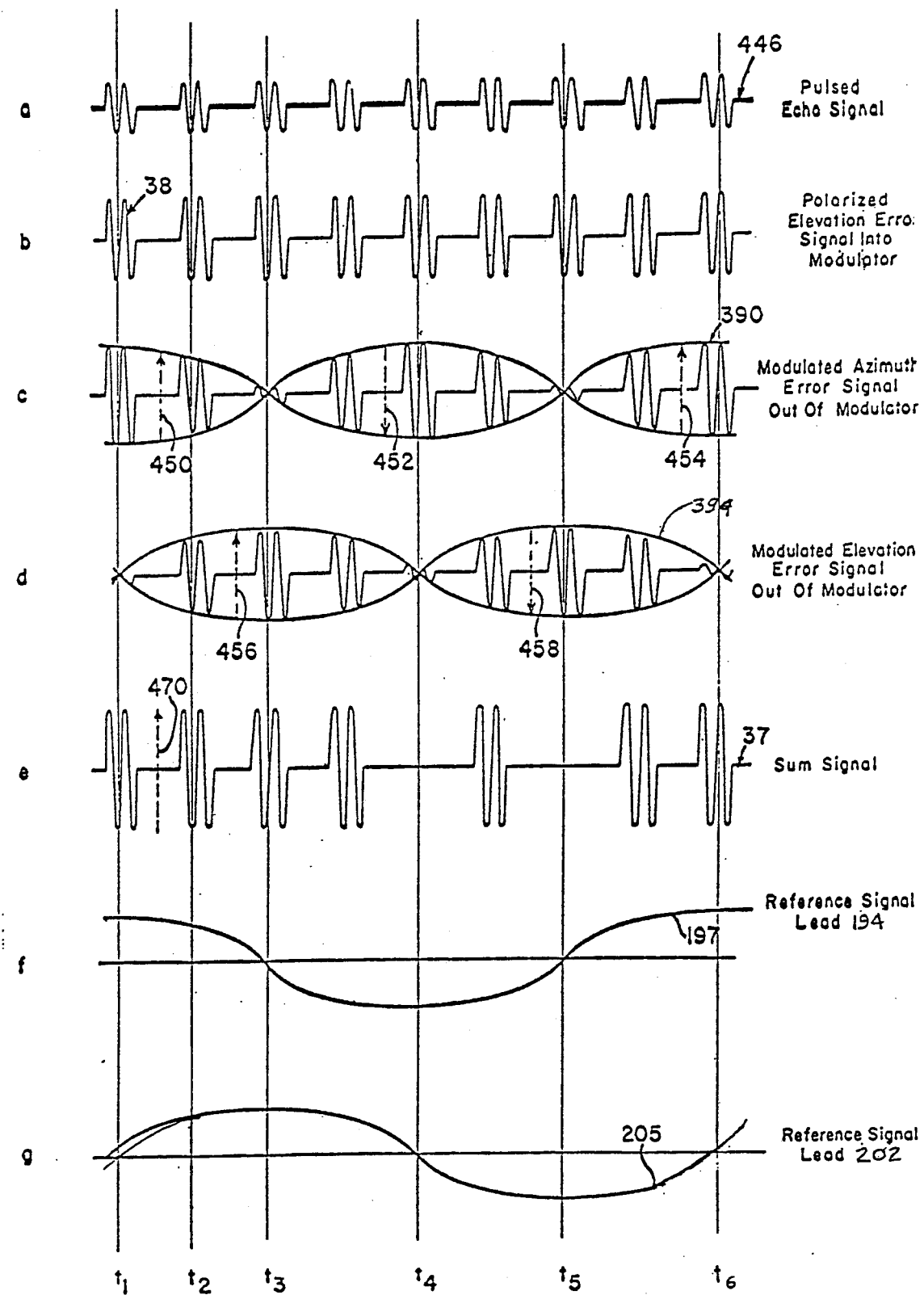
FIG. 8 is a schematic diagram of waveforms for explaining the operation of the system of FIG. 1.
Figure 9:
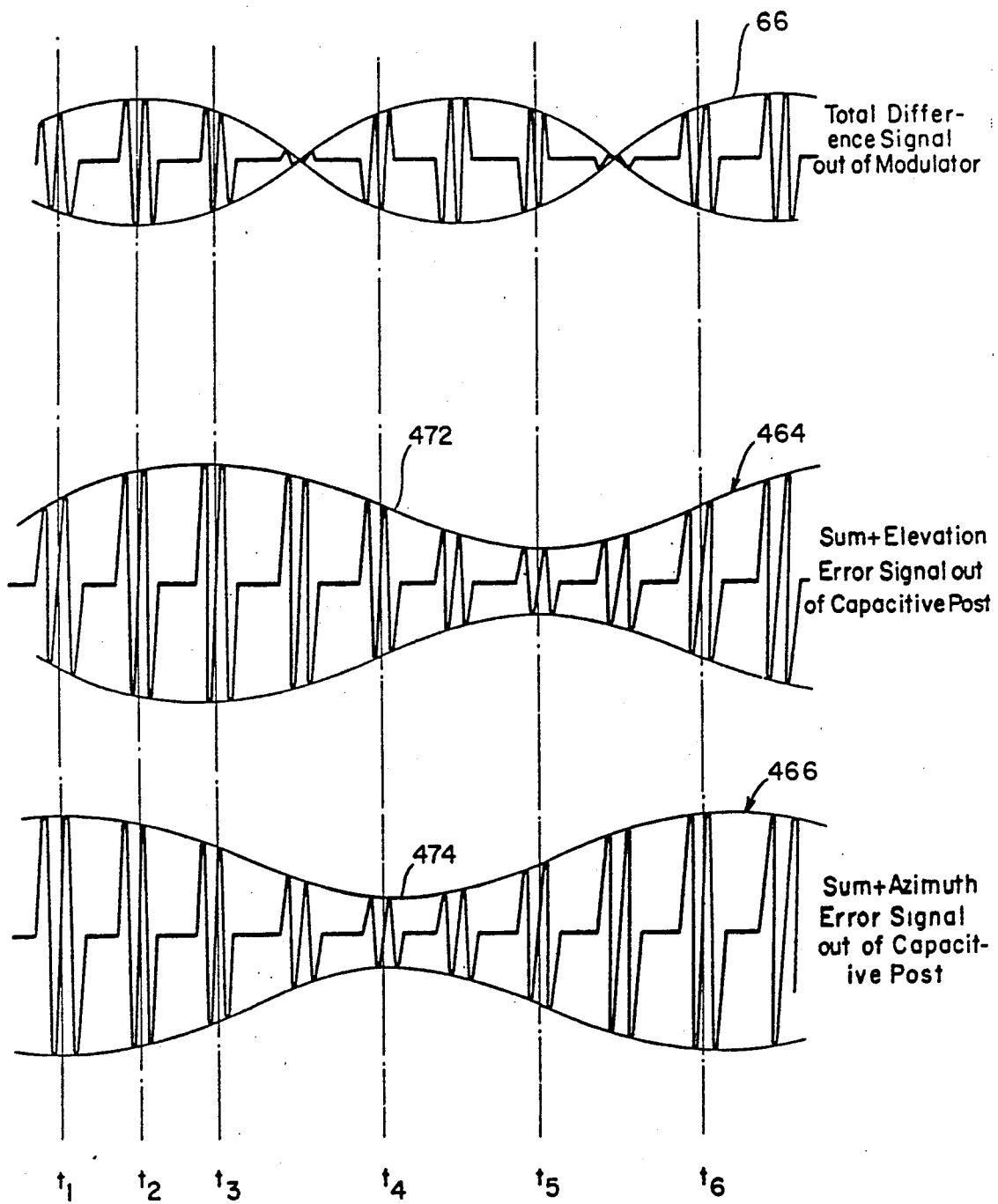
FIG. 9 is a schematic diagram of additional waveforms for explaining the operation of the system of FIG. 1.

Referring now to FIG. 1 and to the waveforms of FIGS. 8 and 9, the operation of the system in accordance with this invention will be explained in further detail. Although the system will be explained when operating as a pulsed radar system, it is to be noted that the system in accordance with this invention is also equally applicable to continuous wave operation. The magnetron 116 in response to synchronized control pulses from the modulator 124 applies pulsed bursts of radio frequency energy to the waveguide 118, the energy appearing similar to a waveform 446 except of larger amplitude. The pulsed energy passes into the first port 126 and out of the second port 128 of the circulator 120 into the waveguide 112. The energy then passes into the first port 100 and out of the second port 102 of the circulator 98 and into the waveguide 36. The energy similar to the waveform 446 then passes through the sum and difference network 30 substantially without loss, is radiated equally from the four apertures 23 and is reflected from the disc 21 into space.

The transmitted signal is then reflected from an object in space such as the craft 27 which may be above or below an azimuth plane through the axis 24, to the right or left of an elevation plane through the axis 24 or exactly on the axis 24. The echo signal is then intercepted by the dish 21 and received by the four apertures 23 to be applied to the sum and difference network 30 as shown by the waveform 446. In response to the arrangement of the magic tee couplers, as discussed previously, the elevation difference or error signal of the waveform 38 is applied to the waveguide 32 and to the coupler 42 polarized in the up-down direction. The azimuth difference or error signal of the waveform 48 is applied to the waveguide 34 polarized right-left and applied to the coupler 42. The elevation and azimuth error signals are then applied to the modulating section 44 of the modulator 46 in space quadrature to be modulated or lobed at a selected frequency.

The variable frequency oscillator 172 applies the signal of the waveform 182 to the lead 188 at a frequency determined by the lobing frequency selection switch 178. The reference signals of the waveforms 197 and 205 are respectively applied to the leads 195 and 203 with the signal 205 delayed in phase 90 degrees. Thus as discussed relative to FIG. 4 the incident signals are rotated by the ferrite modulator section 44 and passed through the plane of acceptance 289 of the waveguide section 56 of the coupler 54 to the waveguide 64. The modulated azimuth error signal of the waveform 390 is in phase with the reference signal of the waveform 197 and represents only the azimuth error portion of the combined signal of the waveform 66 in the waveguide 64. The elevation error signal of the waveform 394 is in phase with the reference signal of the waveform 205 and represents only the elevation portion of the total error signal of the waveform 66. The amplitude of the azimuth error signal of the waveform 390 represents the angular deviation of the path of the return energy right or left of a vertical plane coincident with the antenna axis 24. The polarity sequence of electrical vectors such as 450, 452 and 454 is determined by the position of the object in space being above or below the above-discussed horizontal plane. It is to be noted that the electrical vectors such as 450 and 452 are shifted 180 degrees in phase at each half cycle of the modulation. Also it is to be noted at this time that the error signals of the waveforms 390 and 394 are double sideband suppressed carrier signals.

The amplitude of the elevation error signal of the waveform 394 represents the angular deviation of the path of the return energy above or below a horizontal plane coincident with the antenna axis 24. The polarity sequence of electrical vectors such as 456 and 458 determine whether the object in space 27 is above or below this horizontal plane. When the object in space such as 27 is aligned with the antenna axis 24, no error signals are present and when the object is coincident with the horizontal or vertical plane through the axis 24 the elevation or the azimuth error signals respectively have zero amplitude. The total combined error signal of the waveform 66 has a phase and amplitude determined by the combined error signals of the waveforms 390 and 394. Thus the error signals are modulated on reception with the phase relation being utilized for separation of the components during processing. The frequency of the modulation is variable either to selected specific values or continuously so that an enemy jamming source is unable to determine a frequency to provide effective jamming or changing of amplitude of the error signals.

The combined error signal of the waveform 66 is applied through the ferrite isolator 70 to the waveguide 72 substantially without attenuation and in turn applied to the post 80. The received sum signal of the waveform 37 is simultaneously applied to the waveguide 36, to the second port 102 and out of the third port 104 of the circulator 98 where the energy is reflected by the short circuit termination 108 back into the circulator 98 and out of the fourth port 106 into the waveguide 110 polarized in an up-down direction. The sum signal of the waveform 37 is applied through the waveguide 110, through the shutter device 90, which is open for tracking and anti-jam operation, and to the waveguide 86.

The summing operation is performed by the post 80 which may be in the 3 db reflection position for normal tracking or in the 10 db reflection position for anti-jam tracking operation where principally error signal is desired for processing. In the 3 db position approximately half of the error signal energy of the waveform 66 is reflected from the post 80 and absorbed in the ferrite isolator 70 with the other half of the energy being passed to the waveguide 86. Also when the post 80 is in the 2 db position, approximately half of the sum signal energy is passed through the post 80 to be absorbed by the ferrite isolator 70 and approximately half of the energy is reflected back into the waveguide 86. The error signal passed through the post 80 and the reflected sum signal are effectively summed to form a combined signal of the waveform 113, reference FIG. 1. The 3 db post position decouples the sum voltage by 0.7 and the error voltage signal by 0.7.

The combined portion of the azimuth error signal of the waveform 390 and a portion of the sum signal of the waveform 37 provides a combined signal of a waveform 466 (FIG. 9) in the waveguide 86 after summing at the capacitive post 80. A waveform 464 represents the summed portion of the elevation error signal of the waveform 394 and of the sum signal of the waveform 37 in the waveguide 86. It is to be noted that the combined signals of the waveforms 466 and 464 respectively represent the condition when the error signal is all azimuth signal or all elevation signal and are shown for clarity of the description. As shown by the waveform 466, the azimuth error signal of the waveform 390 adds to the sum signal of the waveform 37 which has electrical vectors such as 470, between times $t_1$ and $t_3$ and times $t_5$ and $t_6$, and subtracts from the sum signal between times $t_3$ and $t_5$. Similarly, the elevation error signal of the waveform 394 aids to the sum signal of the waveform 37 between times $t_1$ and $t_4$ and subtracts from the sum signal between times $t_4$ and $t_6$. The combined signals of the waveforms 464 and 466 have respective amplitude modulated envelopes 472 and 474. It is to be noted that in the anti-jam position of the capacitive post 80, the summing operation is similar except a large amplitude error signal and a small amplitude sum signal are added or summed. With the 10 db post position the sum voltage signal is decoupled by approximately 0.31 and the error voltage signal by approximately 0.95.

The combined signal of the waveform 113 is, in FIG. 1, applied to the fourth port 106 and appears at the first port 100 of the circulator 98 where the signal is passed to the waveguide 112. The combined signal of the waveform 113 then passes into the circulator 120 at the second port 128 and out of the third port 130 into the waveguide 136. The transmit-receive tube 138 allows the lower amplitude received energy to pass therethrough to the waveguide 142 but prevents any high energy leakage energy from passing during transmission. The combined signal of the waveform 113 is then applied to the mixer 144 where in response to the local oscillator 146 the signal is heterodyned to an intermediate frequency signal. The IF common signal similar to the waveform 113 except at intermediate frequency is then applied to the IF amplifier 150 to be amplified in the common amplifier so as to eliminate the conventional phase and amplitude balancing problems of a system utilizing a plurality of IF amplifiers.

The amplified signal from the IF amplifier 150 is passed to the range gate 154 which, as is well known in the art, may provide time discrimination to reduce the noise passed therethrough. The common IF signal derived from the range gate 154 is then passed to a conventional envelope box car detector 158 which acts to convert the carrier wave to a DC (direct current) signal for providing a reference signal of the waveform 160 while retaining the sideband information at the amplitude modulation frequency of the common signal similar to the waveform 113. The DC signal derived from the envelope detector 158 is then passed through the low pass filter 164 which essentially passes only the DC signal to the automatic gain control circuit 166. The automatic gain control circuit 166 varies the amplification of the IF amplifier 150 so as to normalize the amplification in response to the peak amplitude of the sum signal so that the sum signal is utilized to provide the reference amplitude for the error signals developed by the sum and difference network 30. The detected sideband error signals of the waveform 160 are then applied from the lead 159 to the phase sensitive detectors 168 and 170. The reference signal of the waveform 160 includes phase and amplitude information of the envelopes 472 and 474 respectively representing the elevation and azimuth error information.

The reference signals of the waveforms 197 and 205 are respectively applied to the phase sensitive detectors 168 and 170 to separate the in phase elevation and azimuth error components from the combined signal of the waveform 160 and develop DC output signals (not shown) on the leads 206 and 208. The DC output signals on the leads 206 and 208 have voltage levels indicative of the relative peak amplitudes of the modulated elevation and azimuth error signal components of the detected error signal of the waveform 160. The DC error signals on the leads 206 and 208 are then applied to angle servo circuits which may control the direction of pointing of the antenna system 20 or may control the guidance of the craft.

Referring now to the spectral diagram of FIG. 10 which is a diagram showing frequency versus amplitude of signals in various portions of the system in accordance with this invention, the overall operation will be explained in further detail. The error signals derived from the sum and difference network 30 as well as the sum signal are represented by a diagram 470 which shows a signal 480 at a frequency $$\frac{\omega_x}{2\pi}$$

where $\omega_x$ is the radio, microwave or ultra high frequency of the received energy. The combined error signal at the output of the modulator 46 is shown by a diagram 482 having double sideband signals 484 and 486 each including the modulated error signal of the waveforms 390 and 394. The sideband signals 484 and 486 are each separated from the carrier frequency $\omega_x$ by a frequency difference of $$\frac{\omega_n}{2\pi}$$

where $\omega_n$ is the selected frequency of the reference signals of the waveforms 197 and 205 and of the lobing frequency. Thus the frequency separation of the modulated sidebands varies with the angular velocity of the rotating field of the modulator 46. An interfering signal received by the antenna system 20 must be received substantially at a frequency difference of $$\frac{\omega_n}{2\pi}$$

from the carrier frequency in order to interfere with the amplitude of the error signals and thus interfere with the directional information. Therefore in order to overcome interfering jamming signals, the angular velocity of the field is varied by varying the frequency of the variable frequency oscillator 172. The spectral positions of the sideband signals 484 and 486 may vary in a continuous pattern or randomly as determined by the selection switch 178. Because the phase sensitive detectors 168 and 170 respond only to signals at the frequency of the reference signals of the waveforms 197 and 205, which is the frequency $\omega_n$, undesired jamming signals not having a similar frequency to the sideband signals 484 and 486 have substantially little effect on the detected error signal.

Thus the ferrite modulator 46 develops a double sideband suppressed carrier signal of the diagram 482 which is summed with carrier or sum signal by the capacitive post 80 to form the signal of a diagram 490. The relative amplitudes of the sum signal and error signal of the diagram 490 is determined by the position of the post 80 and the position of the craft 27. The detected signal at the output of the envelope detector 158 is shown by a diagram 492 with the sum signal frequency shifted to a DC signal 494. A pass band 496 of the low pass filter 164 applies only the DC signal to the AGC circuit 166 and applies the combined detected error signal 498 at a frequency $$\frac{\omega_n}{2\pi}$$

to the phase sensitive detectors 168 and 170.

Referring now principally to FIG. 1, the system operation will be further clarified by some mathematical representations. The elevation and azimuth energy that appears at the output of the modulator 46 is of the form $$E_o = N(\sin \omega_x t \sin \omega_n t) + \epsilon(\sin \omega_x t \cos \omega_n t) \quad (1)$$

where
N = the initial elevation error signal amplitude and
$\epsilon$ = the initial azimuth error signal amplitude.

Thus as can be seen from equation (1) the output of the modulator of the waveform 66 is a sinusoidally modulated suppressed carrier error signal containing azimuth and elevation error information.

The sum signal $E_s$ which is the reference signal is of the form $$E_s = K \sin \omega_x t \quad (2)$$

where
K = peak amplitude.

The sum signal $E_s$ is then combined with the error signal $E_o$ at the capacitive post.

Before further explaining the operation during tracking and an anti-jam condition both of which utilize the error signal, the operation during the search mode will be further described referring principally to FIG. 1. During search operation, the error signal channel is not required as angle tracking information is not used by the radar system and maximum sensitivity is required. Thus, the waveguide shutter 90 is closed in response to the shutter control switch 96 and any energy applied through the error channel and through the post 80 is reflected from the waveguide shutter 90 to be absorbed in the isolator 70. The sum signal of the waveform 37 is applied from the waveguide 36 to the waveguide 110 and is reflected by the posts 92 and 93 of the shutter 90 back into the fourth port 106 of the circulator 98. The unmodulated sum signal then passes out of the first port 100 of the circulator 98 to the waveguide 112 and through the circulator 120 to the waveguide 136. The sum signal is then heterodyned in the mixer 144 and amplified in the IF amplifier 150. For search operation, the switch 153 may be opened and the IF sum signal is applied only through the lead 159 to control the display, for example. It is to be noted that other arrangements may be utilized for processing the IF sum signal during searching, as is well known in the art.

Figure 11:
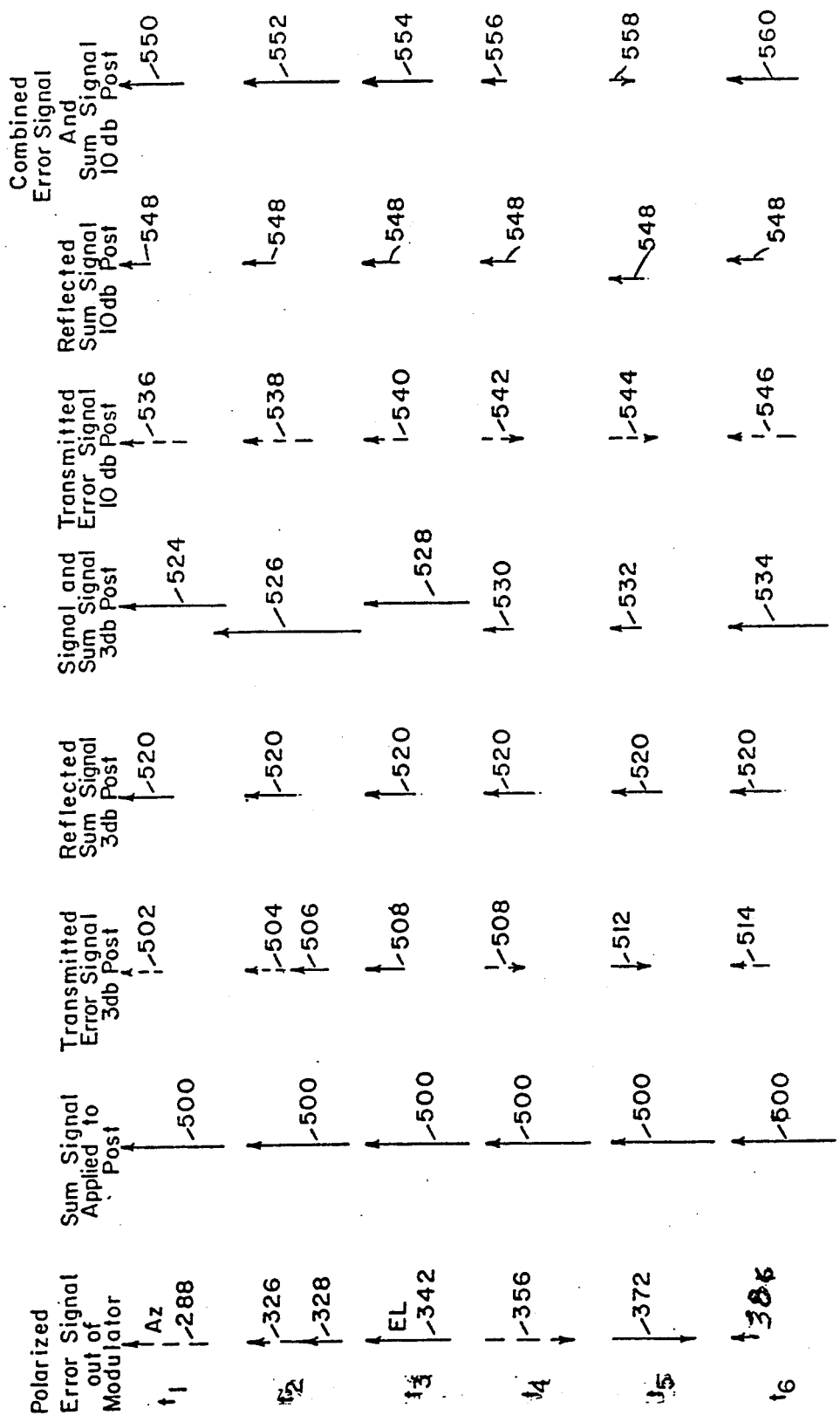
FIG. 11 is a diagram of electrical vectors for explaining the operation of the system of FIG. 1 during tracking and anti-jam mode operation.

Referring now to the schematic vector diagram of FIG. 11 as well as to FIGS. 1, 8 and 9, tracking and anti-jam operation will be explained in further detail. The error signals accepted by the waveguide 64 at the output of the modulator 46 are shown by electrical vectors 288, 326, and 328, 342, 356, 372 and 386 at respective times $t_1$ to $t_6$ as explained relative to FIG. 4. The sum signal applied to the post 80 is shown by a vector 500 at times $t_1$ to $t_6$ having the same amplitude. It is to be noted that the error signal vectors are for a condition of substantially equal elevation and azimuth error with the dotted vectors representing azimuth and the solid line arrows representing elevation. For the 3 db reflection position of the capacitive post 80 the error signals transmitted through the post 80 are reduced substantially one half in power or reduced by 0.3 in voltage amplitude as shown by the electrical vectors 502, 504 and 506, 508, 510, 512 and 514 at respective times $t_1$ to $t_6$. The reflected sum signal is approximately 0.3 of the incident amplitude as shown by vectors 520. The combined error signal and sum signals at times $t_1$ to $t_6$ is shown by respective vectors 524, 526, 528, 530, 532 and 534.

The post 80 is selectively moved to the 10 db reflection or retracted position for anti-jam operation. In this position, approximately one tenth of the sum signal energy is reflected and nine tenth of the error signal energy is passed therethrough to provide a combined signal that is principally error signal. The sum voltage signal is decoupled 0.31 and the error voltage is decoupled 0.95 when the post is in the 10 db position. In the pressure of a jammer it is desirable to increase the percentage of modulation of the error signal so increased error signal is provided. The transmitted error signal which is substantially seven tenth of the total error signal voltage is shown at times $t_1$ to $t_6$ by respective vectors 536, 538, 540, 542, 544 and 546. The reflected sum signal is shown by vectors 548 having substantially equal amplitudes between times $t_1$ and $t_6$. The combined error signal and sum signal as summed at the post 80 is shown at times $t_1$ to $t_6$ by respective vectors 550, 552, 554, 556, 558 and 560. The period between times $t_1$ to $t_6$ represents an error condition that may be corrected by the signals on the leads 206 and 207 by steering the craft, for example, so that the error signals may go to zero. It is to be noted that the system in accordance with this invention is not limited to the above discussed positions of the post 80 but other positions may be utilized in accordance with the principles of this invention.

Figure 13:
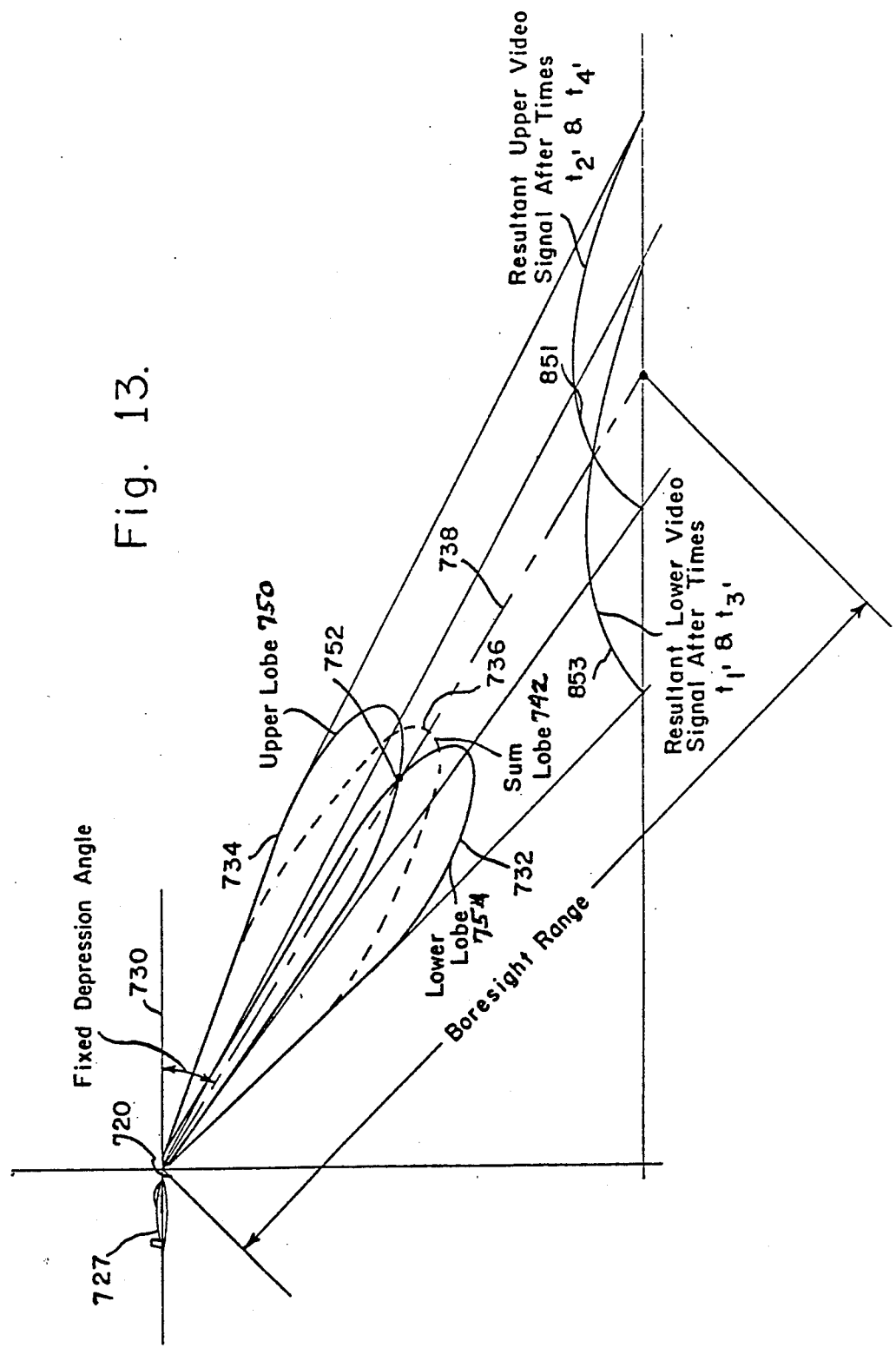
FIG. 13 is a schematic diagram showing the craft during terrain avoidance operation for explaining the resultant lobing in accordance with this invention.
Figure 14:
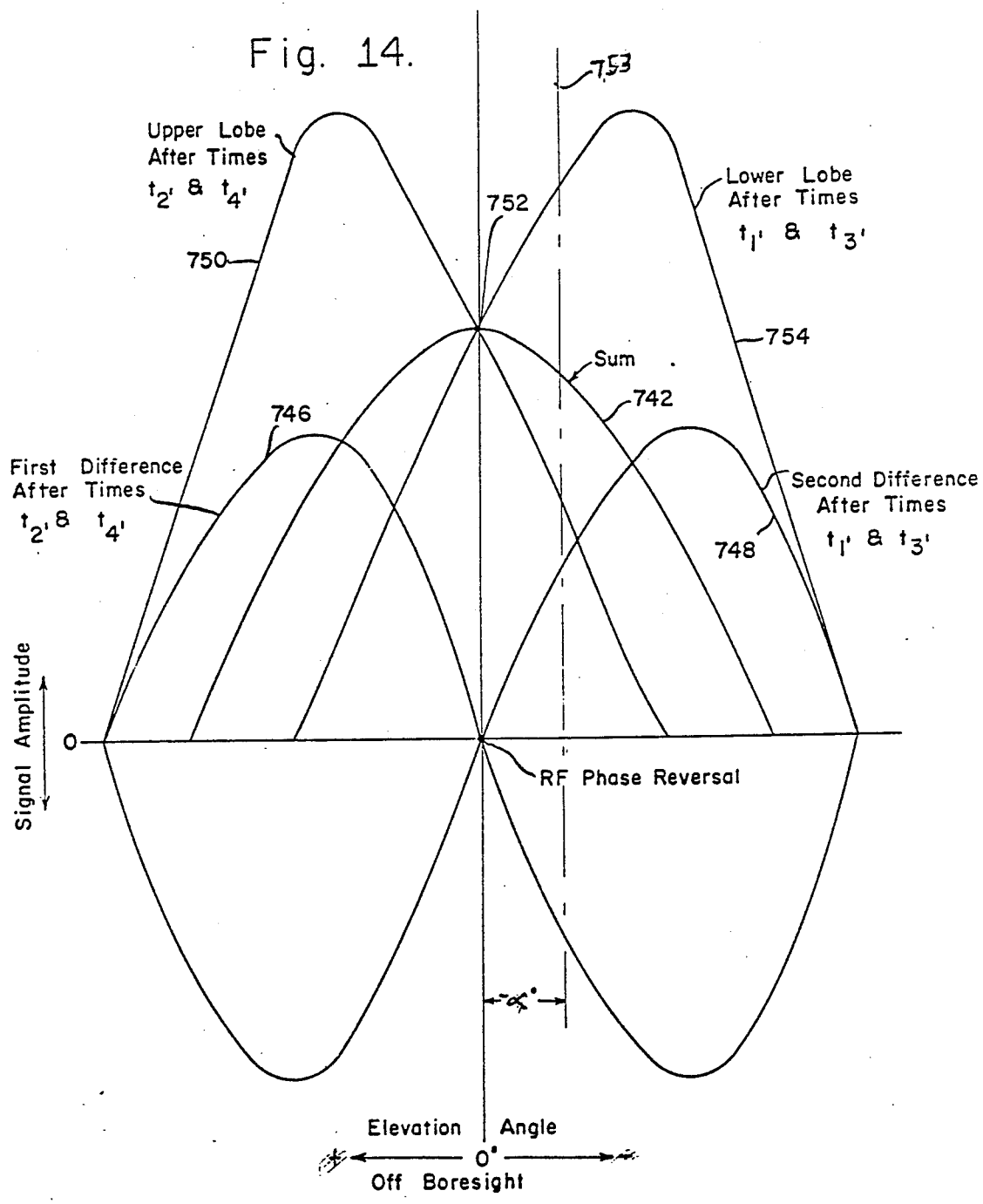
FIG. 14 is a graph of signal amplitude versus elevation angle off boresight for explaining the development of the antenna lobes by the operation of the modulator of FIG. 1 during terrain avoidance operation.

Referring now to FIGS. 13 and 14 the terrain avoidance processing operation will be explained in further detail. A craft 727 may fly horizontally with its antenna 720 positioned at a fixed depression angle below a flight path 730 of the craft. In response to the scan control servo 29 of FIG. 1 the antenna 720 continually scans in azimuth through a selected angle. The energy return from terrain, for example, is in the form of a lower lobe 732 and upper lobe 734 which are the effective lobes after summing in the system of FIG. 1. A sum lobe 736 is the transmitted energy lobe. The boresight axis of the antenna system is at the crossover point 752 of the lobe 732 and 734 and the center of the sum lobe 736 as shown by a line 738 which is coincident with the axis 24 of FIG. 1. To determine a terrain profile the system in accordance with the invention determines boresight range to terrain or other objects on the boresight line 738. Referring now principally to FIG. 14, the general operation of the modulator to invert the error signal during alternate time periods so as to provide an upper and a lower lobe having characteristics indicative of the boresight axis will be generally explained. The sum energy 742 is returned at RF (radio frequency) in response to each transmitted pulse with a constant reference phase. The difference energy is returned with an RF phase reversal at the boresight axis for energy reflected from objects above and below the boresight axis as shown by a first difference signal 746. When the RF energy return is inverted in the modulator 46 the polarity of the difference energy in the upper lobe and in the lower lobe are both inverted to form a second difference energy signal 748. The first difference signal 746 when summed with the sum energy signal 742 at the capacitive post 80 forms an upper lobe 750 crossing over through the boresight axis crossover point 752. During the next time period when the field of the modulator 46 inverts the electrical vectors the second difference energy 748 is summed with the sum energy 742 to form a lower lobe 754 also passing through the crossover point 752. The lobes 750 and 754 are respectively the lobes 734 and 732 of FIG. 13. Thus it can be seen that the crossover 752 may be utilized to determine the boresight axis of the antenna system 720. By combining the sum and difference energy in this manner, the combined signals at the crossover point have a positive value to allow simplified processing.

Referring now to the waveforms of FIG. 12 as well as to FIGS. 1 and 4 the operation of the modulator 46 during terrain avoidance operation in accordance with this invention will be further explained. At times $t_3$ and $t_5$ of FIG. 4 the elevation vectors are alternately rotated 180 degrees in response to the peak amplitude of the sinusoidal reference signal of the waveform 205 during normal radar operation reference FIG. 8. Also at times $t_3$ and $t_5$ during normal operation the azimuth energy is dissipated on the load 61 so that only the elevation signals are applied to the waveguide 64. Thus by applying a square wave reference signal of the waveform 570, reference FIG. 12, at the positive and negative peak amplitudes of the waveform 205 to the lead 203 so that the magnetic field is continuously inverted, the polarity of the elevation difference signal is alternately inverted in the modulator 46 and the azimuth difference signal is continuously absorbed by the load 61. The switch 190 of FIG. 1 is opened and the switch 222 is closed so that square waves of the waveform 570 are applied to the lead 203. The switch 191 is opened during terrain avoidance operation so that the field of the modulator 46 does not rotate but is continuously inverted. The switch 207 is closed and the switch 209 is opened so that a phase shift is not provided. Although the square wave of the waveform 570 is applied around the 90 degrees phase shifter circuit 198, other arrangements in accordance with this invention may utilize the undelayed reference signal. The reference signal of the waveform 570 is delayed a period from the beginning of each transmitted pulse to allow time for the current to overcome the inductance of the modulator 46.

In terrain avoidance operation, the pulse repetition frequency, as shown in FIG. 12 by a waveform 755, is twice the cyclical rate of the reference signal of the waveform 570. The pulses of the waveform 755 are transmitted at times $t_1'$, $t_2'$, $t_3'$ and $t_4'$ and each is intercepted from a target such as terrain. The intercepted energy is applied through the modulator 46 and applied as the elevation error signal of a waveform 757 to the waveguide 64. The pulses of the waveform 757 and of waveforms 759 and 761 are shown for an angle $-\alpha$ off boresight along a line 753 of FIG. 14 for convenience of illustration. At this selected angle off boresight, the pulse of the error signal of the waveform 757 shortly after time $t_1'$ has a first polarity or phase relation and after time $t_2'$ has the opposite polarity or a shift in phase of 180 degrees. This inversion is caused by the field changing direction in response to the reference signal of the waveform 570 to invert the signals 746 and 748 of FIG. 14. The same inversion of the error signal occurs in the pulses after times $t_3'$ and $t_4'$. The sum signal of a waveform 759 has a constant reference phase and is applied to the post 80 with the error signal of the waveform 757. It is to be noted that for energy returned on the boresight axis, the pulses of the waveform 757 have zero amplitude and for energy return on an angle $+\alpha$ of boresight, the pulses of the waveform 757 are inverted. The post 80 may be maintained in the 3 db position for the terrain avoidance operation.

The combined signal at the post 80 as shown by a waveform 761 representing energy return at the angle $-\alpha$ off the boresight axis, is effectively the sum of the sum signal and a positive error signal after times $t_1'$ and $t_3'$ and the sum of the sum signal and a negative error signal after times $t_2'$ and $t_4'$. Thus the amplitude of the combined signal during each alternate time period and for energy return from all boresight angles is the sum signal with the error signal alternately added and subtracted therefrom because of the inversion of the electrical vectors by the modulator 46. This summing with a phase reversal of the error signal during each alternate cycle provides the respective upper and lower lobes 750 and 754. The combined signal of the waveform 761 as well as combined signals resulting from energy return over the entire scan angle after being converted to an IF signal are applied through the closed switch 218 to the terrain avoidance processor 216. Thus the signals such as of the waveform 761 during one period such as between times $t_1'$ and $t_2'$ represents the lower lobe and the signals during the period between times $t_2'$ and $t_3'$ represents the upper lobe which will provide range at the boresight or axis of the antenna system 720 of FIG. 13. Along the line 753 of FIG. 14, the amplitude of the lower lobe 754 and the upper lobe 750 are respectively large and small to correspond to the amplitude of the pulses of the waveform 761 such as after respective times $t_1'$ and $t_2'$. It is to be noted that the intervals of time between times $t_1'$, $t_2'$, $t_3'$ and $t_4'$ may be substantially longer relative to the pulse width but is shown relatively short for convenience of illustration.

Figure 16:
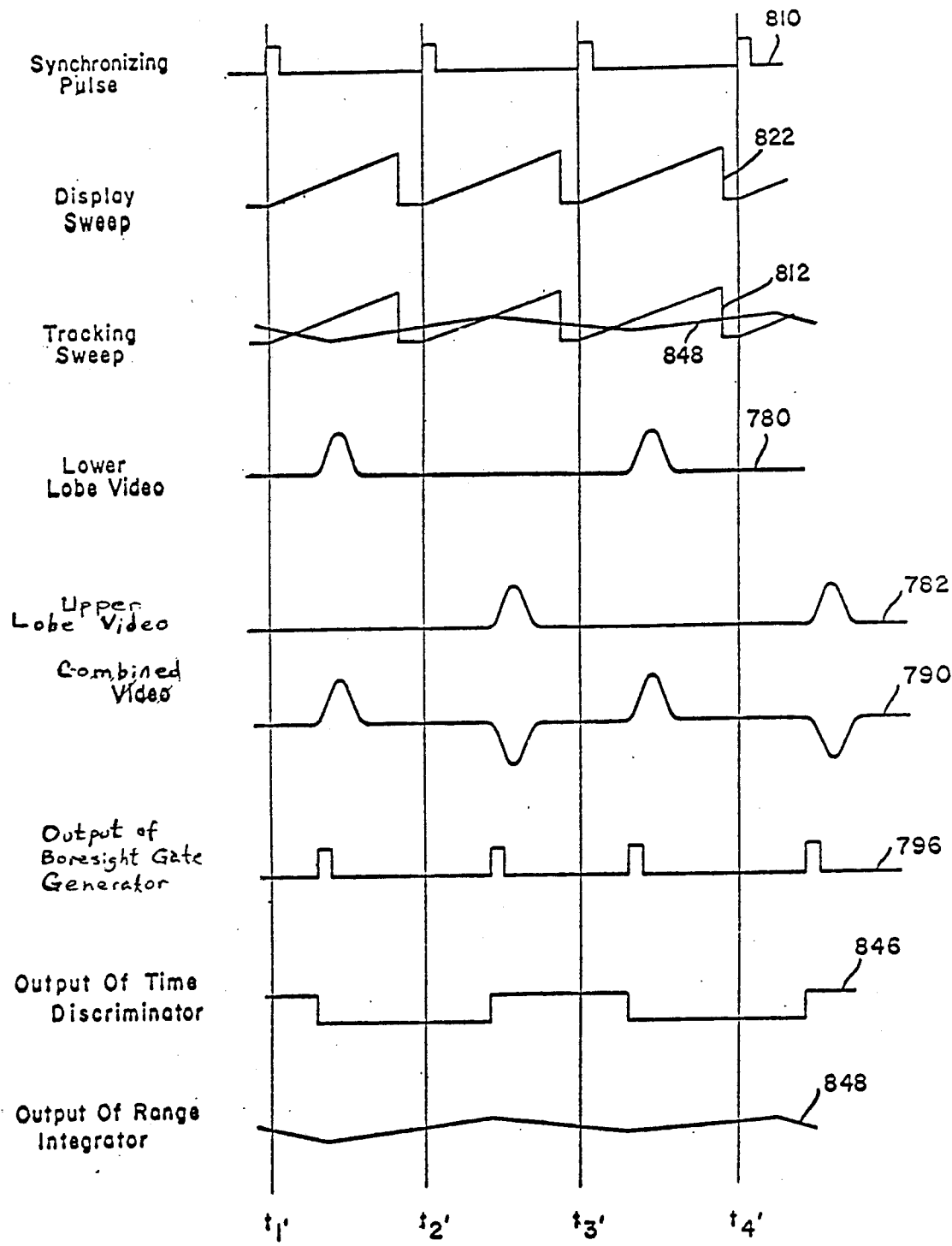
FIG. 16 is a schematic diagram of waveforms for explaining the operation of the terrain avoidance processor system of FIG. 15.

Referring now to FIGS. 15 and 16 the operation of the terrain avoidance processor system will be explained in further detail. An IF signal having a waveform 758 similar to the waveform 761 of FIG. 12 except heterodyned to IF frequency and resulting from energy return at all angles relative to the boresight axis are applied from the lead 219 through the closed switch 218 to an envelope detector 760 and in turn through a lead 762 to a video amplifier 784. The video envelope of a waveform 766 having a lower lobe portion resulting from the RF signal after times $t_1'$ and $t_3'$ and an upper lobe portion resulting from the RF signal after times $t_2'$ and $t_4'$ is applied from the amplifier 764 to a lead 768. During each time period, either an upper lobe or a lower lobe signal is applied to the waveform 766. The video signal of the waveform 766 is then applied to gates 772 and 774 for respectively passing the lower lobe and the upper lobe signals of the waveform 766. The square wave pulse of the waveform 570 is applied from the multivibrator 220 of FIG. 1 through the lead 223 to the gate 772 and an inverted form of the waveform 570 as shown by a waveform 776 is applied through the lead 221 to the gate 774. During the positive positions of the signals of the waveforms 570 and 776 the gates 772 and 774 respectively pass a lower lobe signal of a waveform 780 and an upper lobe signal of a waveform 782 to respective leads 784 and 786 to a differential amplifier 788. The differential amplifier 788 is arranged to invert the upper lobe signal of the waveform 782 and to apply amplified signals of a waveform 790 to a lead 792. A time discriminator 794 responds to the signal of the waveform 790 and a pulse of a waveform 796 applied through a lead 797 to periodically pass energy from the lead 792 into a storage capacitor (not shown) or from the storage capacitor to the lead 792.

As is well known in the art the time discriminator 794 may include a series path of a resistor, the anode to cathode of a first diode, a resistor, the anode to cathode of a second diode and another resistor coupled between suitable potential sources. The cathode of the first diode and the anode of the second diode may be respectively coupled through the cathode to anode path of a third diode and the anode to cathode path of a fourth diode to a storage capacitor which in turn may be coupled to an output lead 798. The pulse signal of the waveform 796 may be applied through an inverting arrangement so as to apply a negative pulse to the anode of the first diode and a positive pulse to the cathode of the second diode. The lead 792 may be coupled to the resistor between the cathode of the first diode and the anode of the second diode so as to pass or receive energy from the storage capacitor during the period of the pulse of the waveform 796, with the current passing to the capacitor or the current discharging from the capacitor being determined by the amplified either positive or negative portion of the lower lobe or the upper lobe signals of the waveform 790. The stored signal in the time discriminator 794 is then applied through the lead 798 to a range integrator 800 which as is well known in the art forms a DC signal representative of the stored energy in the time discriminator 794, which in turn is applied to a coincidence circuit 804 through a lead 802.

A boresight tracking sweep generator 808 is provided to respond to pulses of a waveform 810 applied to the lead 211 from the modulator 124 of FIG. 1. A linear sweep voltage of a waveform 812 is applied from the generator 808 through a lead 814 to the coincidence circuit 804. In response to a voltage coincidence of the sweep of the waveform 812 and the DC level of the signal on the lead 802, indicative of the stored range in the time discriminator 794, a pulse signal of a waveform 814 is applied through a lead 816 to a boresight gate generator 818, which in turn forms the amplified pulse of the waveform 796.

A display sweep generator 820 is provided to respond to the pulses of the waveform 810 to periodically develop a display sweep of a waveform 822 on a lead 824. A sine-cosine resolver 826 is provided to respond to the sweep signal of the waveform 822 and a reference signal (not shown) applied from the scan control circuit 29 through a lead 828 to provide an azimuth sweep reference. The sine-cosine resolver 826 may be a conventional sine-cosine potentiometer arrangement in which the sweep signal of the waveform 822 and an inverted form thereof are applied to opposite corners of a bridge circuit and rotating taps positioned 90° relative to each other rotate an arc to contact the bridge resistors at the rate and coincident with the azimuth sweep of the antenna system 20. Thus, suitable $\sin \theta$ and $\cosine \theta$ signals (not shown) are applied through leads 828 and 830 to a display system 832 which, for example, may be a conventional cathode ray display tube. The sine and cosine signals on the leads 828 and 830 may control the horizontal and vertical deflection plates so that the electron beam signals from an apex 736 periodically moves radially representative of range at a continually increase angle representative of the angular azimuth position of the antenna axis 24. The pulse of the waveform 796 indicative of the range at the antenna boresight axis is applied through a lead 738 to the intensity modulating element of the cathode ray tube of the display system 832 which may be the grid or the cathode depending upon the conventional arrangement utilized. It is to be noted that a line 740 represents the terrain profile as a function of azimuth position and range in response to the electron beam and a line 742 which may be etched on the surface of the scope is a calculated range representative of a horizontal plane at a selected distance below the craft 27 through which the boresight axis cuts an arc.

Referring now principally to FIGS. 15 and 16 the operation of the terrain avoidance processor will be explained in further detail. The lower lobe video signal of the waveform 780 occurs after times $t_1'$ and $t_3'$ at a time after the modulated synchronizing pulses of the waveform 810 representative of range of the lower lobe energy 754 as shown in FIG. 13 and 14. The upper lobe video signal of the waveform 782 is summed at alternative times such as times $t_2'$ and $t_4'$ with the period after the modulated synchronizing pulses of the waveform 810 representing range of the energy return on the upper lobe 750, reference FIG. 13 and FIG. 14. As shown by the waveform 790 the differential amplifier inverts the upper lobe and combines the signals of the waveform 780 and 782. The gates 772 and 774 are provided so that during alternate periods the proper video lobe signal is applied through the inverting portion of the differential amplifier 788. The time discriminator 794 responds to the pulses of the waveform 796 to pass a portion of the energy on the lead 792 to the storage capacitor therein. After times $t_1'$ and $t_3'$ the energy is applied from the lower lobe signals and after times $t_2'$ and $t_4'$ the energy may be applied from the capacitor to the upper lobe video signal. The signal on the lead 798 may have the form of a waveform 846 with a movement of the waveform downward in voltage representing a closing range and a movement upward of the waveform may represent an increasing range. For example, when the waveform 846 moves downward the lower lobe signal of the waveform 790 may be temporarily passing more energy into the time discriminator 794 than is removed at the time of the upper lobe video signal. It is to be noted that the lower lobe video signal of the waveform 780 occurs at a shorter time interval after the synchronizing pulses of the waveform 810 than the upper lobe signal of the waveform 782. The pulses of the waveform 796 gate a portion of the signals of the waveforms 780 and 782 in the time discriminator 794. The signal of the waveform 846 is then smoothed in the range integrator 800 to form the DC signal of a waveform 848. The signal of the waveform 848 when coincident with the tracking sweep signal of the waveform 812 forms the pulse of the waveform 814 at a time dependent upon the amplitude of the waveform 848. Thus the time position of the waveform 796 during each inter-pulse period is varied to maintain substantially equal current passing from the signal of the waveform 790 to the time discriminator 794 in response to the lower lobe signal and from the time discriminator to the lead 792 in response to the upper lobe signal. Although each adjacent time period alternately represents energy returned on the lower lobe or the upper lobe, the system effectively maintains the pulses of the waveform 796 centered on the upper and the lower lobe video signals from a common time of transmitting each pulse.

Thus the time occurence of the pulses of the waveform 796 during each time period is maintained centered at the time of energy return on the boresight axis 738 of FIG. 13. Indications 851 and 853 are shown in FIG. 13 to further illustrate that the crossover point of the video signals at two adjacent time intervals is on the boresight axis 738. Thus the system in accordance with the invention provides range on the boresight axis of the antenna by inverting the error signal in the modulator 46 during alternate transmitting periods.

The system in accordance with this invention operates at any desired transmitted radio frequency or microwave frequency such as in the X band and is not to be limited to any particular frequency band.

Thus there has been described an improved radar system that provides lobing on reception with the lobing frequency being selective or continuously variable. The received error energy is lobed or modulated and selected portions may be combined with selected portions the sum or reference signal for different types of operations such as tracking or anti-jamming. Means are provided to utilize only the sum signal for search operation. The system provides terrain avoidance processing by sequentially inverting only the received elevation error signal. The arrangement of circulators in accordance with this invention provides a simplified and highly reliable system for both transmitting and receiving. By utilizing the arrangement in accordance with this invention, a conventional conical scan type system may be converted to a silent lobing monopulse type system.

What is claimed is:

1. A combination comprising: a monopulse antenna for intercepting informational signals reflected from objects and having a boresight axis, a sum and difference network coupled to said monopulse antenna and having an azimuth error terminal, an elevation error terminal and a sum terminal, a modulator including an input coupler coupled to said azimuth and elevation error terminals for coupling the azimuth and elevation error signals in space quadrature, a modulating section coupled to said input coupler and having field windings for forming a closed field to continually rotate the coupled error signals in response to reference signals during a first mode of operation and to alternately invert the coupled error signals in response to a square wave signal during a second mode of operation, an output coupler coupled to said modulating section to pass signals through a first plane of acceptance to a first output and to pass signals through a second plane of acceptance to a second output, means for receiving the signals from said second plane of acceptance, an isolator coupled to said coupler for passing signals from said first plane of acceptance, reflective means coupled to said isolator and having a capacitive post for reflecting a selected portion of signals applied thereto, a circulator having first, second, third and fourth ports with the second port coupled to said sum terminal of said sum and difference network for receiving a sum signal and said fourth port coupled to said reflective means, said capacitive post summing selected portions of the signals received from said first plane of acceptance and the sum signal to form a common signal, the common signal formed in response to said reference signals containing angular tracking information relative to an object and in response to said square wave signal containing time information representative of boresight range to an object, short circuit means coupled to said third port, a controllable source coupled to said modulating section for selectively applying said reference signals and said square wave signal to said modulating section, and processing means coupled to the fourth port of said circulator and to said controllable source for processing said common signal to provide the tracking information when the modulator receives said reference signals and to provide boresight range when said modulator receives said square wave signal.

2. A system for transmitting unmodulated microwave energy and for selectively providing radar tracking of an object or terrain avoidance operation comprising: a monopulse antenna having a boresight axis, a sum and difference network coupled to said monopulse antenna and having an azimuth error terminal, an elevation error terminal and a sum terminal, a modulator including an input coupler coupled to said azimuth and elevation error terminals for coupling azimuth and elevation error signals in space quadrature, a modulating section coupled to said input coupler and having field windings for forming a closed field to continually rotate the coupled error signals in response to reference signals during tracking operation and for alternately rotating the field 90 degrees in response to a square wave signal during terrain avoidance operation, an output coupler coupled to said modulating section to pass signals through a first plane of acceptance to a first output terminal and to pass signals through a second plane of acceptance to a second output terminal, the azimuth and elevation signals being applied to the first output terminal amplitude modulated 90 degrees out of phase from each other in response to said reference signals and the elevation signal being applied to the first output terminal alternately inverted in response to said square wave signal, means for receiving the signals from said second output terminal, an isolator coupled to said first output terminal for passing signals from said first plane of acceptance, reflective means coupled to said isolator and having a capacitive post for reflecting signals, a first circulator having first, second, third and fourth ports with the second port coupled to said sum terminal of said sum and difference network and said fourth port coupled to said reflective means, said capacitive post summing the error signals and the sum signal to form a first common signal during tracking operation and to form a second common signal during terrain avoidance operation, the first common signal containing angular information of an object and the second common signal containing time information representative of range on the boresight axis, short circuit means coupled to the third port of said first circulator, a source of said reference signals coupled to the field windings of said modulating section to provide the continually rotating field, a source of said square wave signals coupled to the field windings of said modulating section to alternately rotate the field 90 degrees, switching means coupled between said sources of reference signals and square wave signals and said field windings to select radar tracking or terrain avoidance operation, a second circulator having first, second and third ports with the second port coupled to the first port of said first circulator, a source of transmitting energy coupled to the first port of said second circulator, signal processing means coupled to the third port of said second circulator and to said source of reference signals for separating elevation and azimuth modulation components from said first common signal to determine tracking error during radar tracking operation, and terrain avoidance processing means coupled to the third port of said second circulator and to said signal processing means for responding to the second common signal to determine range on the boresight axis.

3. A combination for controlling the amplitude of first and second microwave signals to provide a resultant signal and for summing selected portions of the resultant signal with a third microwave signal and applying the summed signal to an output means comprising: a modulator including an input coupler for coupling the first and second signals in space quadrature, a modulating section coupled to said input coupler and responsive to control signals to provide a field to rotate the coupled first and second signals, and an output coupler coupled to said modulating section and having first and second output terminals with fixed planes of acceptance, said second output terminal receiving a resultant signal, dissipative means coupled to the first output terminal, an isolator coupled to the fixed plane of acceptance of the second output terminal of said output coupler for passing the resultant signal therethrough, reflecting means coupled to said isolator and including a post, circulating means coupled to said reflective means and to said output means and having a first path for applying the third signal to said post and having a second path for applying said summed signal of the resultant signal and the sum signal from said post to said output means, and a source of said control signals coupled to said modulating section to control the field thereof.

4. A radar lobing system comprising: sources of elevation error signals, azimuth error signals and sum signals, modulating means coupled to said sources of elevation and azimuth error signals for amplitude modulating the error signals at a selected lobing frequency, isolating means coupled to said modulating means for passing the modulated error signals therethrough, a microwave post coupled to said isolating means, circulating means having a first terminal coupled to said source of sum signals, a second terminal coupled to said microwave post and having a third terminal, and receiving means coupled to the third terminal of said circulating means, whereby the elevation and azimuth error signals are modulated in said modulating means and combined with said sum signal passed through said first and second terminals of said circulating means to said microwave post to form a combined signal, said combined signal being passed from said post and transferred through said second and third terminals of circulating means to said receiving means.

5. A radar system combination comprising: sum and difference network means having first and second difference signal outlets and a sum outlet, modulating means coupled to said first and second difference outlets for rotating the first and second difference signals in space quadrature and for coupling said rotated signals to an output terminal with a selected polarization and having first and second difference signal components in phase quadrature, an isolator coupled to the output of said modulating means, a capacitive post coupled to said isolator, first circulating means including first, second, third and fourth ports with the second port coupled to the sum signal output of said sum and difference network means and the fourth port coupled to said capacitive post, microwave short circuit means coupled to said third port of said first circulating means, second circulating means including first, second and third ports with the second port coupled to the first port of said first circulating means, a source of transmitting energy coupled to the first port of said second circulating means, receiver processing means coupled to the third port of said second circulating means, and a source of variable frequency reference signals coupled to said modulating means for controlling the rotation of said difference signals in space quadrature and coupled to said receiver processing means for separating the first and second difference signal components.

6. The combination in a microwave processing system for providing lobing by amplitude modulating first and second error signals to be combined with a sum signal to be utilized in a receiving means or for applying only the sum signal to the receiving means comprising: a modulator including input and output couplers and a rotating field section, said input coupler combining said first and second error signals in space quadrature, said rotating field section providing a continuously rotating magnetic field for effectively rotating said error signals in space quadrature at a velocity determined by reference signals to provide a selected lobing frequency, said output coupler providing a polarized plane of acceptance of the rotated error signals to provide amplitude modulated error signals, capacitive post means coupled to the output coupler for receiving the modulated error signals, unidirectional isolator coupled between said output coupler and said capacitive post means for passing said modulated error signals to said capacitive post and substantially absorbing reflected signals, a controllable shutter coupled to said capacitive post means, a circulator having first, second, third and fourth ports with the second port responsive to said sum signals and the fourth port coupled to said shutter means, short circuit means coupled to said third port, said capacitive post means transferring a selected portion of said error signals and sum signals to said fourth port as a summed signal and transferring a second portion of said error signals and said summed signals to said isolator for being absorbed therein, receiving means coupled to the first port of said circulator, and a source of variable frequency reference signals coupled to said modulator for providing the selected lobing frequency to said error signals, said shutter being open to apply said summed signal to said receiving means and being closed to apply only said sum signal to said receiving means.

7. A radar lobing system comprising: antenna means for developing from echo signals intercepted from a target a sum signal, an elevation signal and an azimuth signal, said signals being at microwave frequency, the elevation and azimuth signals having relative voltage amplitudes indicative of the direction of said target, modulating means for amplitude modulation the elevation and azimuth signals in phase quadrature relative to each other at a desired modulation frequency in response to reference signals having a frequency proportional to said modulation frequency, said modulating means including means for developing said reference signals, a unidirectional isolator coupled to said modulating means for passing the modulated elevation and azimuth signals therefrom, a capacitive post coupled to said isolator for reflecting and passing selected portions of said amplitude modulated elevation and azimuth signals, a circulator having first, second, and third connections with the first connection receiving said sum signal said second connection coupled to said capacitive post, said capacitive post reflecting the selected portions of said sum signal, said capacitive post summing the modulated elevation and azimuth signals passed therethrough and said sum signal reflected therefrom to a common signal which is applied to the third connection of said circulator, mixer means coupled to the third connection of the said circulator for heterodyning the common signal to an intermediate frequency signal, and detecting means coupled to said mixer means and to said means for developing said reference signals to respond to said reference signals for separating components of the elevation and azimuth signals from said intermediate frequency signal having characteristics indicative of the direction of said target.

8. A system for modulating first and second microwave signals and combining the first and second signals with a third microwave signal comprising: modulating means including an output coupler for joining the first and second signals in space quadrature, a section having a rotating magnetic field for rotating said first and second signals applied from said input coupler, and an output coupler having a terminal for accepting the rotating first and second signals in a selected plane as modulated first and second signals, an isolator coupled to said output coupler, a reflective post coupled to said isolator, said reflective post reflecting and passing selected portions of signals applied thereto, circulating means having a first terminal for receiving said third signal and a second terminal coupled to said reflective post for applying said third signal thereto, said circulating means having a third terminal for receiving from the second terminal a summed signal of portions of the modulated first and second signals passed through said reflective post and a portion of the third signal reflected from said reflective post.

9. A system for determining the range on boresight axis of monopulse antenna means to an object in an elevation plane, said antenna receiving energy from the object with an upper and lower lobe comprising: sum and difference means coupled to said antenna means and having elevation and azimuth difference terminals and a sum terminal, a circulator having first, second, third and fourth ports with the second port coupled to said sum terminal, a source of pulses coupled to said first port for transmitting a pulse of signals at a transmitting frequency during each of a plurality of sequential time periods from said antenna means to the object, said antenna means intercepting the pulses reflected from said object and said sum and difference means applying elevation and azimuth difference signals and a sum signal to corresponding terminals thereof, a modulator having an input coupler coupled to said elevation and azimuth difference terminals for coupling said elevation and azimuth difference signals in space quadrature, having a magnetic field rotating 90 degrees during each time period for alternately inverting the vectors of said elevation and azimuth difference signals during each second time period and having an output coupler for accepting only the elevation vectors, isolating means coupled to said output coupler for receiving the alternately inverted elevation difference signals and passing said difference signals to an output terminal, a reflective post coupled to the output terminal of said isolating means and to the third port of said circulator, said reflective post passing and reflecting selected portions of the sum signal and the alternately inverted difference signals and summing the reflected portions of the sum signal and the passed portions of the alternately inverted difference signals to a combined signal, said combined signal passing respectively to said fourth and first ports of said circulator, alternate pulses of said combined signal representing a resultant upper lobe of the upper lobe combined with the sum signal and a resultant lower lobe of the lower lobe combined with the sum signal, short circuit means coupled to the third port of said circulator, mixing means coupled to the first port of said circulator, detecting means coupled to said mixing means for forming video pulses alternately representing the resultant upper and lower lobes, and processing means coupled to said mixing means for determining a time substantially centered between the time of occurrence of the upper lobe video pulses and the time of occurrence of the lower lobe video pulses representative of range of the boresight axis.

10. A system for combining the elevation error signal with a sum signal, said signals received from a monopulse type antenna having a boresight axis, said error signal representing upper and lower lobes of energy return having a phase reversal above and below the boresight axis, the combined signal providing a time indication of the upper and lower lobes of the antenna return for determing the range on the boresight axis of the antenna in elevation by comparing the time of occurrence of the combined signal during succeeding time periods, said system dissipating the azimuth error signal from said antenna comprising: a modulator having an input coupler coupled to the antenna means for coupling the elevation and azimuth error signals in space quadrature, a field section coupled to said first coupler for alternately inverting the vectors of said error signals and passing the vectors therethrough without an inversion, and an output coupler coupled to said field section and having first and second output terminals respectively with first and second planes of acceptance, the first output terminal passing the azimuth error signals and the second plane of acceptance passing the elevation error signals, a dissipative load coupled to said first output terminal, an isolator coupled to said second output terminal for passing the elevation error signal therethrough, summing means coupled to said isolator and including a reflective post, a circulator having first, second and third terminals with the second terminal coupled to said summing means, said circulator passing sum signals from said first terminal to said second terminal to sum a portion of said sum signals and said error signals at said reflective post and passing the combined signal from the second terminal to the third terminal, the combined signal at said third terminal representing the upper and the lower lobes of the antenna return during succeeding time periods and having times of occurrence representative of range on the boresight axis.

11. A radar system comprising: a monopulse antenna, a sum and difference network coupled to said monopulse antenna and having an azimuth error terminal, an elevation error terminal and a sum terminal, a modulator including an input coupler coupled to said azimuth and elevation error terminals for coupling azimuth and elevation error signals in space quadrature, a modulating section coupled to said input coupler and having field windings for forming a closed field to continually rotate the coupled error signals in response to reference signals, an output coupler coupled to said modulating section to pass signals through a first plane of acceptance to a first output and to pass signals through a second plane of acceptance to a second output, the azimuth and elevation signals at the second output being amplitude modulated 90 degrees out of phase from each other, means coupled to said first output for receiving the signals from said first plane of acceptance, an isolator coupled to said second output for passing signals from said second plane of acceptance, reflective means coupled to said isolator and having a capacitive post for reflecting signals, a first circulator having first, second, third and fourth ports with the second port coupled to said sum terminal of said sum and difference network and said fourth port coupled to said reflective means, said capacitive post summing the error signals and the sum signal to form a common signal, short circuit means coupled to the third port of said first circulator, a source of said reference signals coupled to the field windings of said modulating section to provide the rotating field, a second circulator having first, second and third ports with the second port coupled to the first port of said first circulator, a source of transmitting energy coupled to the first port of said second circulator, and signal processing means coupled to the third port of said second circulator and to said source of reference signals for separating elevation and azimuth modulation components from said common signal.

12. A combination in a radar system comprising: monopulse antenna means, a sum and difference network coupled to said antenna means and having an elevation error signal output, an azimuth error signal output and a sum signal output, a modulator having an input orthogonal mode transducer coupled to said elevation error signal output and to said azimuth error signal output for coupling the azimuth and elevation error signals in space quadrature, a rotating section coupled to said input transducer and having a field winding for responding to first and second reference signals to provide a continuously rotating magnetic field at right angles to the direction of transmission of said error signals for continuously rotating said error signals and having an output orthogonal mode transducer for accepting said error signals in a fixed plane to provide elevation and azimuth error components modulated 90 degrees out of phase from each other, reflective means having a first end coupled to the fixed plane of acceptance of said second transducer and having a post for reflecting signals, a controllable shutter coupled to a second end of said reflective means, a first circulator having first, second, third and fourth ports with the second port coupled to the sum signal output of said sum and difference network and the fourth port coupled to said shutter, short circuit means coupled to the third port of said first circulator, said reflective means summing selected portions of the error signals and said sum signal into a common signal when said shutter is open, a second circulator having first, second and third ports with the second port coupled to the first port of said first circulator, a source of transmitting energy coupled to the first port of said second circulator, signal processing means coupled to the third port of said second circulator, and a source of said first and second reference signals coupled to the field winding of said rotating section and to said signal processing means for separating the azimuth and error components from said common signal and for responding to the sum signal when said shutter is closed.

13. A combination for modulating first and second microwave signals and for summing the first and second modulated signals with a third microwave signal and applying the summed signal to an output means comprising: a modulator including an input coupler for coupling the first and second signals in space quadrature, a modulating section coupled to said input coupled and responsive to first and second reference signals to provide a continuously rotating magnetic field to rotate the coupled first and second error signals, and an output coupler coupled to said modulating section and having first and second output terminals with fixed planes of acceptance for receiving modulated first and second signals in phase quadrature, dissipative means coupled to the first output terminal, an isolator coupled to the fixed plane of acceptance of the second output terminal of said output coupler for passing the modulated first and second signals therethrough, reflecting means coupled to said isolator and including a capacitive post, circulating means coupled to said reflective means and to said output means and having a first path for applying the third signal to said post and having a second path for applying a summed signal from said post to said output means, and a source of first and second reference signals in phase quadrature coupled to said modulating section to control the field.

14. A radar lobing system comprising: sources of elevation error signals, azimuth error signals and sum signals, modulating means coupled to said sources of elevation and azimuth error signals for amplitude modulating the error signals in phase quadrature at a selected lobing frequency, isolating means coupled to said modulating means for passing the modulated error signals therethrough, a reflective post coupled to said isolating means, means coupled to said post for moving said post so that selected portions of signals applied thereto from either direction are reflected and passed, circulating means having a first terminal coupled to said source of sum signals, a second terminal coupled to said reflective post and having a third terminal, and receiving means coupled to the third terminal of said circulating means, said circulating means having paths between said first and second terminals and between said second and third terminals, whereby the elevation and azimuth error signals are modulated in said modulating means and applied to said reflective post and said sum signal is applied to said reflective post from said circulating means, a selected portion of said error signals transferred through said post and selected portion of said sum signal reflected from said post are summed and applied to said receiving means, the portions of said sum signal passed through said post and the error signals reflected from said post are absorbed in said isolating means.

15. A radar system for transmitting microwave energy having unmodulated voltage amplitudes from a transmitting means and for intercepting the energy from a target comprising: antenna means for developing sum, elevation and azimuth signals at microwave frequency in response to the energy intercepted from said target, said signals having given directions of polarization and having relative voltage amplitudes indicative of the direction of said target from said antenna means, first coupling means for coupling the elevation and azimuth signals to that their directions of polarization are in orthogonal planes, modulating means coupled to said first coupling means for continually rotating at a selected velocity the directions of polarization of the coupled elevation and azimuth signals, a source of reference signals coupled to said modulating means for selecting the velocity of rotation, second coupling means coupled to said modulating means for accepting the rotating elevation and azimuth signals in a fixed plane of acceptance to provide amplitude modulated elevation and azimuth signals in phase quadrature relative to each other, a unidirectional isolator coupled to said second coupling means for passing the modulated elevation and azimuth signals therethrough, a capacitive post coupled to said isolator for passing and reflecting selected portions of signals applied thereto, post selection means coupled to said capacitive post for varying the portions of passed and reflected signals, a first circulator having first, second, third and fourth ports, a second circulator having first, second and third ports, the second port of said first circulator coupled to said antenna means for passing the transmitted microwave energy and for receiving the sum signal, microwave short circuit means coupled to the third port of said first circulator, a movable shutter coupled between said capacitive post and the fourth port of said first circulator, control means coupled to said shutter for selectively opening and closing said shutter, said first port of said first circulator coupled to the second port of said second circulator, said first port of said second circulator coupled to the transmitting means, mixing means coupled to the third port of said second circulator, and detecting means coupled to said mixing means and to said source of reference signals for developing output signals having characteristics representative of the relative amplitudes of the sum, elevation and azimuth signals when said shutter is open, said sum signal being applied to said mixing means when said shutter is closed, said capacitive post providing a summed signal with selected portions of said sum signal and said modulated elevation and azimuth signals.

* * * * *